US012566639B2

(12) United States Patent
Mo et al.

(10) Patent No.: US 12,566,639 B2
(45) Date of Patent: Mar. 3, 2026

(54) TECHNIQUES FOR AUTO-TUNING COMPUTE LOAD RESOURCES

(71) Applicant: Oracle International Corporation, Redwood Shores, CA (US)

(72) Inventors: Haining Mo, Kenmore, WA (US); Qiang Wang, Bellevue, WA (US); Travis John Portz, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 683 days.

(21) Appl. No.: 17/513,777

(22) Filed: Oct. 28, 2021

(65) Prior Publication Data

US 2023/0136226 A1     May 4, 2023

(51) Int. Cl.
*G06F 9/50* (2006.01)

(52) U.S. Cl.
CPC .................................... *G06F 9/505* (2013.01)

(58) Field of Classification Search
None
See application file for complete search history.

(56) References Cited

U.S. PATENT DOCUMENTS 5,283,897 A * 2/1994 Georgiadis ............ G06F 9/5083
712/30
9,342,801 B2 5/2016 Certain et al.

10,997,098 B2 5/2021 Longo et al.
11,347,550 B1 * 5/2022 Harjono ................ G06F 9/3555
2016/0299697 A1 10/2016 Chen et al.
(Continued)

FOREIGN PATENT DOCUMENTS

CN       107704213 A    2/2018
EP       2798488 A1    11/2014
EP       3599547 A1    1/2020

OTHER PUBLICATIONS

"Adjusting IOPS", Available online at https://cloud.ibm.com/docs/ BlockStorage?topic=BlockStorage-adjustingIOPS, 2 pages.
(Continued)

*Primary Examiner* — Wynuel S Aquino
(74) *Attorney, Agent, or Firm* — Kilpatrick Townsend & Stockton LLP

(57) ABSTRACT

Techniques are disclosed for automated and dynamic compute resource allocation in an infrastructure-as-a-service (IaaS) environment. A system may determine a load threshold value corresponding to a maximum throughput of allocated resources and an active load of processing occurring at those resources. The threshold and load are compared to determine if throttling is occurring at the allocated resources. A specified range of permissible resource allocations is determined. Based on the range of permissible resource allocations, the threshold load value and the active load, the allocated resources may be modified. The modification may be a ramp-up of allocated resources to handle a throttling load or a ramp-down to reduce inefficient resource utilization and processing overhead. The ramp-up or ramp-down may be performed in periodic increments over periodic increments of time to reduce system stress and handle dynamically changing loads. A recommended permissible allocation range may be suggested.

20 Claims, 12 Drawing Sheets

(56)        References Cited

U.S. PATENT DOCUMENTS

| | | | |
|---|---|---|---|
| 2021/0019193 A1* | 1/2021 | Ffrench | G06F 9/5061 |
| 2021/0160317 A1 | 5/2021 | Portz et al. | |
| 2021/0349759 A1* | 11/2021 | Bansal | G06F 9/45558 |
| 2022/0318058 A1* | 10/2022 | Kowalczyk | G06F 9/345 |
| 2023/0104787 A1* | 4/2023 | Hassan | G06F 9/5061 |
| | | | 718/104 |

OTHER PUBLICATIONS

"Amazon EBS Features", Available online at https://aws.amazon.com/ebs/features/, 5 pages.

"Azure Premium Storage: Design For High Performance", Available online at https://docs.microsoft.com/en-us/azure/virtual-machines/premium-storage-performance, 3 pages.

Lu et al., "IOTune: A G-states Driver for Elastic Performance of Block Storage", Available online at https://arxiv.org/pdf/1705.03591.pdf, May 10, 2017, pp. 1-15.

Sharma et al., "Introducing Auto-Tune in Amazon ES", Available online at https://aws.amazon.com/blogs/big-data/introducing-auto-tune-in-amazon-es/, Mar. 24, 2021, 6 pages.

\* cited by examiner

TECHNIQUES FOR AUTO-TUNING COMPUTE LOAD RESOURCES

BACKGROUND

Cloud-based service providers offer a variety of services to customers. For example, a service provider may own and operate cloud-based storage and computing resources that are made available to their customers. Customers may utilize the cloud-based computing resources to store their own data using physical infrastructure implemented by the service provider. In return, the service provider may charge the customer a fee to use the cloud-based storage and computing resources. By this arrangement, the customer may store and processes a high amount of data and/or facilitate a resource-intensive service without needing to own and operate its own physical computing resources.

Different customers of a service provider may require different levels of cloud-based computing resources, based on the needs of the customer. For example, customers with larger amounts of data to store and process may require the use of more computing resources than customers with smaller amounts of data to process over the same time period. Therefore, a one-size-fits-all approach to computing resource distribution among customers is inefficient and not suitable for many customers.

Allocating a static amount of computing resources to each customer is also inefficient, as each customer's data processing needs can often change frequently over short time periods. For example during periods of high traffic (during which the customer or affiliates of the customer are accessing the customer's data frequently), a customer's service may require more computing resources than the static allocation, but during periods of low traffic, only a small fraction of the computing resources can be utilized. A customer may thus pay for the use of more computing resources than are needed, and unused resources cannot be allocated to other customers that may need them more. Customers requiring different resources during a given period are otherwise required to manually request them from the service provider, increasing resource overhead for customers, service providers, and others.

SUMMARY

Aspects of the present disclosure include techniques for auto-tuning compute load resource utilization. Specifically, compute resources are automatically dynamically allocated to users based on compute resource needs and user specified thresholds for allocation. A device/system enables monitoring of compute load (i.e., an amount of data being processed by compute resources) during regular time periods. The device/system can use the monitored compute load and an allocated set of compute resources to determine if the compute resources are being throttled (i.e., the set of compute resources are receiving more compute load than the compute resources are capable of processing during a time period). In response to a determination of whether the compute resources are being throttled, the device/system may automatically reallocate compute resources based on resource thresholds previously set by the user. The device/system may also determine recommended resource thresholds for the user based on historical compute loads and throttling states.

An example method comprises determining, by a computing device and based at least in part on a first set of computing resources, a first load threshold value and an active load value, the active load value corresponding to a level of activity of the first set of computing resources during a first time period; comparing, by the computing device, the active load value and the first load threshold value; determining, by the computing device and based at least in part on the comparison between the active load value and the first load threshold value, a throttle state of the first set of computing resources during the first time period; in response to determining the throttle state, determining, by the computing device, a modification threshold value; comparing, by the computing device, the first load threshold value and the modification threshold value; and modifying, by the computing device and based at least in part on the comparison between the first load threshold value and the modification threshold value, the first set of computing resources, the modification comprising altering a number of computing resources in the first set of computing resources.

In some examples, the first load threshold value corresponds to a maximum throughput of the first set of computing resources and the active load value corresponds to a rate of data being sent to the first set of computing resources. In some examples, the active load value is greater than the first load threshold value and the throttle state indicates that the first set of computing resources is experiencing throttling during the first time period. In some further examples, determining the modification threshold value comprises identifying from a range of permissible modification values, a maximum permissible modification value. In some further examples, modifying the first set of computing resources comprises determining a difference value based at least in part on the modification threshold value and the active load value, determining a second set of computing resources associated with a second load threshold value greater than the difference value; and altering the first set of computing resources by adding the second set of computing resources to the first set of computing resources to form a consolidated set of computing resources.

In some examples, the active load value is less than or equal to the first load threshold value and the throttle state indicates that the first set of computing resources is not experiencing throttling during the first time period. In some further examples, determining the modification threshold value comprises identifying from a range of permissible modification values, a minimum permissible modification value. In some further examples, modifying the first set of computing resources comprises determining a difference value based at least in part on the modification threshold value and the active load value, determining a first subset of the first set of computing resources associated with a second load threshold value less than the difference value, and altering the first set of computing resources by removing the first subset of the first set of computing resources from the first set of computing resources to form a second subset of the first set of computing resources.

In some examples, modifying the first set of computing resources comprises altering the number of computing resources at one or more time intervals of a second time period occurring subsequent to the first time period and altering the number of computing resources comprises adding or removing a static number of computing resources during each of the one or more time intervals of the second time period. In some further examples, the method further comprises receiving, from a client device, the static number of computing resources, wherein the static number of computing resources received from the client device is generated based at least in part on a throttling value corresponding to a proportion of throttling specified by the client device.

In some examples, the first set of computing resources are associated with a client computing device and configured to perform activity on behalf of a user of the client computing device, the active load value corresponds to a current level of activity being performed on behalf of the user at the first set of computing resources, and the modification threshold value is determined based at least in part on a range of modification values, the range of modification values generated by the client computing device.

Another aspect of the present disclosure comprises a system comprising one or more processors and a non-transitory computer-readable media that includes instructions that when executed by the one or more processors, cause the one or more processors to perform the methods described above.

Another aspect of the present disclosure comprises a non-transitory computer-readable media that includes instructions that when executed by one or more processors, cause the one or more processors to perform the methods described above.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
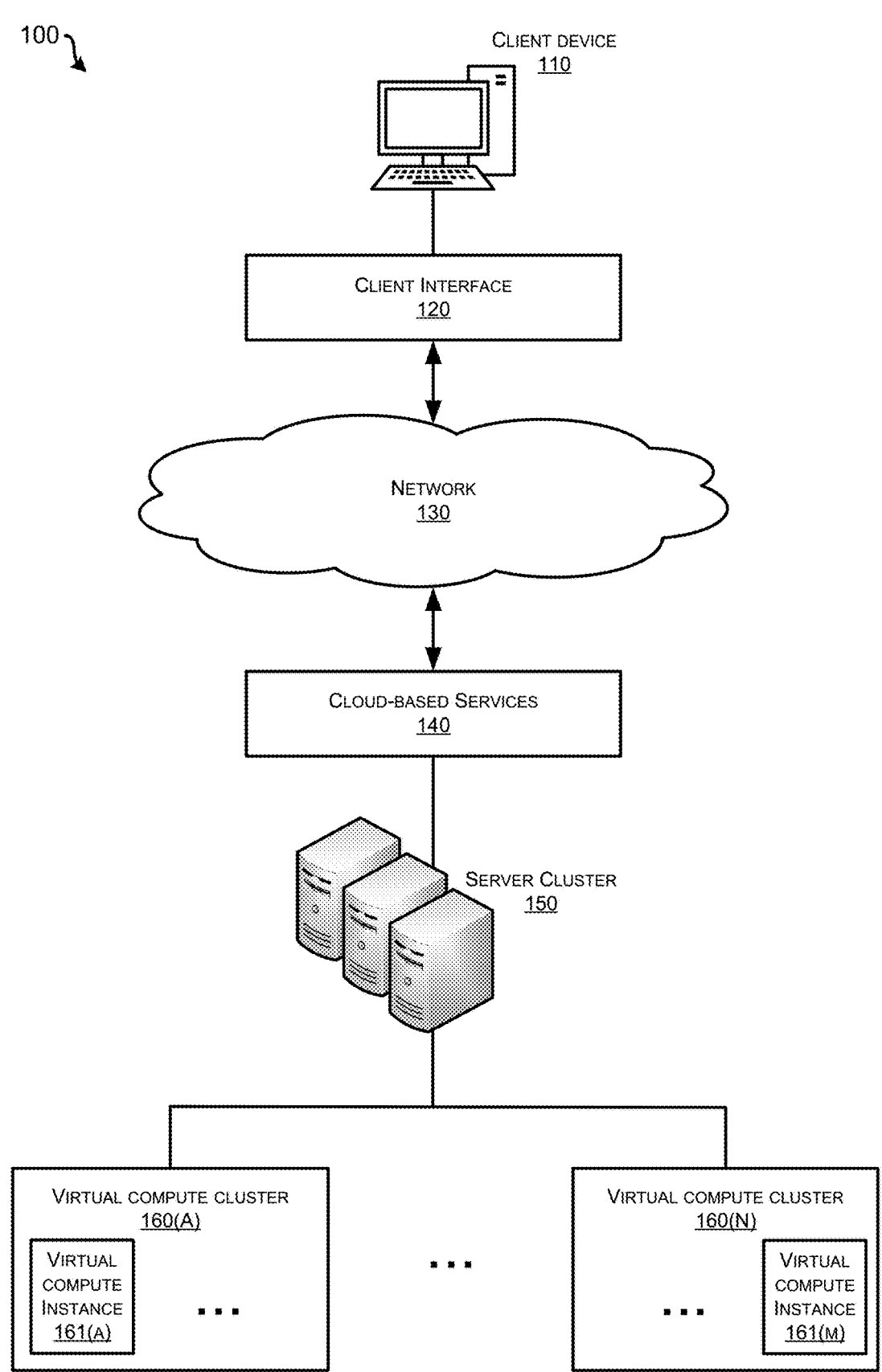
FIG. 1 is a block diagram of a distributed infrastructure-as-a service system for facilitating a cloud-based service accessible to a client according to certain embodiments of the present disclosure.

In the following description, for the purposes of explanation, specific details are set forth in order to provide a thorough understanding of certain embodiments. However, it will be apparent that various embodiments may be practiced without these specific details. The figures and description are not intended to be restrictive.

A cloud-services provider may offer services that a client (also referred to herein as "users," "customers," and "subscribers") can subscribe to. Cloud-based computing services allow the client to utilize cloud-based resources owned and operated by the service provider for the client's own services and applications. For example, a cloud-services provider may make storage and compute resources at a cloud server available to the customer. The storage resources can be digital storage space in a computer memory in which a client may store their data or that can be used to store intermediary data for executing processes on behalf of the client. The compute resources can be virtual compute instances accessible by the client to run applications, services, or implement resources on behalf of the client, and/or process or provide the stored data to users of the client's services. For example, the compute resources may be used to facilitate read, write, and/or share operations for the client's data stored in the computer memory and/or for any cloud service or other implementation desired by the client. The virtual compute instances can include a set of volume performance units (VPUs) which can process data stored in the cloud-based storage. Each VPU of the virtual compute instances has a throughput rate (i.e., a maximum amount of data that the VPU may process during a certain time period). Thus, a set of VPUs can also have a throughput rate, for example, a number of gigabytes of data that the set of VPUs can process over a one second time period (gigabyte per second, or GB/s). As used herein, the terms "compute resources" and "processing resources" are considered analogous terms for resources that can process data as part of the embodiments described herein.

Examples of cloud-based services and compute resources may include any software, processes, services, or other cloud-based offerings from an entity such as a service provider and are not limited by the embodiments and examples described herein. Examples of these cloud-based services and compute resources may include, but are not limited to, cloud-based storage repositories for client data, cloud-based computing resources for implementing client-originating services, virtual machine provisioning and operation, automated response applications, etc. In one example, a cloud-based service and compute resources are utilized to facilitate a cloud-based storage service for storing client data. In another example, a cloud-based service and compute resources are utilized to provide virtual compute resources for a client to execute a cloud-based security the client may offer to as a service to the client's customers.

A service provider may allocate VPU resources to a client on a per-storage basis. Specifically, a service provider may provide a proportional number of VPUs per unit of data stored by the client in a service provider's cloud-based storage. For example, a service provider may provide 10 VPUs per GB of data stored by the client in the service provider's cloud-based storage. Thus, for every GB of data stored by the client in the service provider's cloud-computing storage, the service provider may provide a corresponding number of VPUs for the client to utilize when processing its stored data. The client may regularly leverage the allocated VPUs to access its stored data in the service provider's cloud-based storage in a read/write manner.

As an example, a service provider may allocate 2 terabytes of cloud-based storage to a client as part of a subscription plan. The service provider may also provide, as a default setting of the subscription plan, 10 VPUs per GB of storage through which the client and the client's associates may access the client's data. Thus, the service provider can provide 20,000 VPUs, as a default, to the client through which the stored data may be read, written, shared, or otherwise processed by the VPUs. As part of an additional subscription plan, the service provider may allow the client to instead access different rates of VPU/GB, such as 20 VPU/GB, 30 VPU/GB, etc., to increase the available processing resources, for example to handle higher traffic to the stored data.

As described above, a static level of processing resources made available by the service provider are inefficient and problematic for both the service provider and the client. Traffic to access stored data is variable and can frequently fluctuate between higher and lower compute loads. For example, a client owning data hosted by the service provider and related to business operations may experience high compute loads during regular business hours of a day and low compute loads during other periods. During periods of high compute loads, the compute resources associated with the stored data may regularly become throttled, causing data request backups and slower access to the client's data. Conversely, during periods of low compute loads for one customer, compute resources lie dormant, and are inefficiently allocated to the client instead of another customer that may require more compute resources at the same time. This is also problematic for the client, especially when they are paying for a subscription plan that includes resources the client does not use during most periods of the day.

A client may generate and send manual requests to the service provider to increase or decrease the rate of computing resources allocated to the client during different periods of the day. For example, a client that is allocated 10 VPUs/GB by default may send a manual request to their service provider to increase the rate of compute resources to 20 VPUs/GB when the compute resources are being throttled. Conversely, the customer may send a manual request to their service provider to decrease the rate of compute resources to 0 VPUs/GB, or near zero resources, when the compute resources are being underutilized. However, this requires the client to actively monitor the resource use of the compute resources and generate and send a manual request. The request is parsed and may be implemented by the service provider, at which time throttling may have already disadvantaged the customer.

In various embodiments described herein, techniques for auto-tuning compute load resources utilized are described that can automatically and dynamically allocate compute resources based on current traffic at a set of computing resources. The automatic and dynamic allocation may commence based on an allocation range specified by a client. In some embodiments, a process begins by determining, a first load threshold value and an active load value, the active load value corresponding to a level of activity of a first set of computing resources during a first time period. The first load threshold value may correspond to a maximum possible processing throughput of a set of VPUs allocated to a customer. For example, a customer with access to 2 TB of storage data and a default processing rate of 10 VPU/GB can be allocated 20,000 VPUs to process data. If each VPU is capable of processing 1 MB/sec of data, then the potential maximum throughput for the set of VPUs is 20 GB/sec. The actual maximum throughput may be either the potential maximum throughput or a set throughput per volume specified by a system configuration. The active load value is a current value of compute load experienced at the set of VPUs during the first time period.

A comparison of the first load threshold value and the active load value may determine whether the set of compute resources is currently experiencing throttle. The result of a comparison may be a throttle state that indicates whether throttle is occurring at the set of computer resources during the first time period. The throttle state may be any kind of data, for example a binary flag of true or false, capable of indicating whether throttle is occurring at the set of compute resources. For example, given a set of compute resources with a threshold maximum throughput of 20 GB/sec, and an active load value of 21.3 GB/sec (i.e., the set of VPUs is receiving 21.3 GB of data for processing every second), the comparison may indicate that throttling is occurring. In this state, data received at the set of compute resources can be backlogged and processed in a delayed manner. Alternatively, if the active load value is 9.8 GB/sec, the comparison may indicate that no throttling is occurring, because the active load is less than the load threshold value of 20 GB/sec.

Following comparison of the threshold value and the load value, and/or the throttle state based on the same, a modification threshold value may be identified. The threshold value may be a value determined or identified by a preset range of possible permissible compute resource configurations. The modification threshold value may be an upper or lower bound of compute resources that may be allocated/deallocated to the set of compute resources based on the current traffic at the compute resources. The upper and lower bound may be set by a preconfigured or dynamic range of values. For example, a resource modification range configured by a client may be set between 5 VPU/GB as the lower bound and 30 VPU/GB as the upper bound. This corresponds to a configuration specified by the client that the number of allocated VPU/GB of storage should not be lower than 5 VPU/GB and should not be higher than 30 VPU/GB. The client may select this range, for example, to set bounds on monetary expenditures of a subscription plan offered by the service provider.

Returning to the example above, the modification threshold is determined based on the resource modification range and the indication of throttling. If throttling is occurring, a determined modification threshold may correspond to a upper bound of the resource modification range. With reference to the example above, if it is determined that throttling is occurring and the first load threshold value is 10 VPU/GB, the upper bound of 30 VPU/GB is determined. Conversely, if throttling is not occurring, a determined modification threshold may correspond to an lower bound of the resource modification range. With reference to the example above, if it is determined that throttling is not occurring and the first load threshold value is 10 VPU/GB, the lower bound of 5 VPU/GB is determined. It will be appreciated that the modification threshold value may be any number in the range, and not necessarily the upper of lower bound. For example, a modification threshold value may be a "next step" in the range based on a difference between the first load threshold value and a range increment, or a measured difference between the active load value and the first threshold value.

Once the modification threshold value is determined, the first load threshold value is automatically and dynamically modified. Automatic modification occurs because neither of the client nor the service provider is required to manually specify a modification to the first load threshold in response to the steps above. Dynamic modification occurs because the modification is based on the variable steps outlines above. As part of the modification, the first set of computing resources (i.e., the rate of VPU/GB and thus the total VPUs allocated to a client's processing resources) is altered. This may include altering the set of computing resources to change the maximum throughput of the computing resources. For example, for a client storing 2 TB of data and a default allocation of 10 VPU/GB (and thus 20,000 VPUs allocated), the alteration of the rate to 30 VPU/GB can add 40,000 VPUs to the set of resources, the alternation of the rate to 5 VPU/GB can remove 10,000 VPUs, etc.

The techniques above can automatically and dynamically allocate compute resources based on the needs of a client with promote efficient and fair resource consumption. Allocation of additional resources to a client during periods of high traffic can allow the client to reduce or eliminate throttle of resources without allocating a disproportionate amount of computing resources to a single client or to increase the client's resource utilization past a subscription rate the client is not willing to pay for. Conversely, during periods of low traffic, the service provider's compute resources are freed to be used for other clients while reducing the client's reservation of compute resources and potentially reducing the price of a subscription provided by the service provider.

In various embodiments, allocating resource in accordance with the techniques above may be performed over multiple consecutive time periods. For example, determinations of throttling may occur during a first time period and allocation may occur at the beginning of a second time period immediately subsequent to the first time period. Allocation may include adding or removing a set of compute resources to the current set of allocated compute resources at regular intervals in time or in regular increments of compute resources. For instance, rather than immediately provisioning 40,000 VPUs during a transition from a load threshold value of 10 VPU/GB to 30 VPU/GB, 10,000 VPUs may be allocated up to four times over the course of four consecutive time periods. This prevents unnecessary resource consumption associated with bulk allocation during a single time period. For example, prior to the third allocation of 10,000 VPUs, another comparison may indicate that throttling of resources is no longer occurring. At this point, the final 10,000 VPUs may not be allocated because they are no longer needed to resolve throttling.

A client may have some direct access to the parameters for allocation, for example through a user interface. As described above, the client may set the resource modification range including upper and lower bounds for allocation to pre-configure how resources are automatically and dynamically allocated during future time periods. The client may, for example, utilize a graphical slider in a user interface to select a range of values including the upper and lower bounds for permissible allocation. In this manner, the client may ensure that the resources allocated will not be too little to cause a significant backlog of processing during throttling, and also ensure that the allocations made during throttling does not surpass a pricing threshold of the subscription that the client is unwilling to pay for.

FIG. 1 is a block diagram of a distributed infrastructure-as-a service system for facilitating a cloud-based service accessible to a client according to certain embodiments of the present disclosure. The system 100 depicted in FIG. 1 comprises systems and devices connected directly or indirectly to a network 130 to form a cloud-based infrastructure. Network 130 may be any communicative entity or medium through which data may be transmitted. For example, network 130 may be an internet, intranet, cloud-based network, local area network, hard-line connection, wireless signal, virtual network, or other medium for networked communication between devices. Various networks that may be used will be recognized by one having ordinary skill in the art, and several are also discussed below.

Network 130 may be communicatively coupled to client interface 120. Client interface 120 may be an interface or other software-based service configured to connect a client device to a network, such as network 130. For example, as depicted in FIG. 1, client interface 120 is implemented by client device 110. Client device 110 may be any type of device operating in any format necessary to perform the embodiment described herein, and the number of client devices that may comprise an embodiment is not limited. In various embodiments, a client device 110 is a device operable by a client and/or customer to request, generate, display, and/or interact with a client interface 120. For example, a client may initiate software programming instructions to execute an instance of client interface 120 using processing hardware in client device 110.

Client interface 120 may be a software-based instance of a graphical user interface (GUI) to be implemented as part of the embodiments described herein. For example, a client may utilize the client device 110 to operate client interface 120 to communicate with network 130 and therefore other components of system 100. In various embodiments, client interface 120 establishes a connection with network 130 to facilitate the embodiments described herein. An example of a client interface is given with respect to FIG. 7 below.

Network 130 may be further communicatively coupled to cloud-based services 140. Cloud-based services 140 may be a cloud-based software service implemented across multiple directly or indirectly linked hardware devices. For example, as depicted in FIG. 1, cloud-based services 140 is implemented by server cluster 150. Server cluster 150 may be any type of server device operating in any format necessary to perform the embodiment described herein, and the number of server devices that may comprise a cluster is not limited. In various embodiments, a server cluster 150 is a grouping of device operable by a service provider and/or administrator to store, send, receive, render, generate, and manage generated data relating to a cloud-based services 140.

Server cluster 150 may implement cloud-based services 140 as a cloud-based program, application, or set of instructions executing on one or more server devices of server cluster 150. Cloud-based services 140 may be a set of services available to a client, such as a client user of client device 110 implementing client interface 120, and accessible through network 130. For example, as described herein cloud-based services 140 may include a cloud-storage and processing service available to a client in a subscription-based format through which a user may store data in a cloud-storage environment. Specifically, a client using client device 110 may send, using client interface 120, data to cloud-based services 140 through network 130. The data may be physically stored at local server devices of server cluster 150 and made available to a client or other entities through a web portal made available on network 130.

As depicted in FIG. 1, server cluster 150 utilizes a number of virtual compute clusters 160(A)-160(N). A virtual compute cluster 160 may be a cluster of hardware, software, or combination resources configured to allow for processing data. For example, a virtual compute cluster 160 may be configured to facilitate read, write, and sharing operations for data stored on a memory/disk of server cluster 150 on behalf of a client as part of cloud-based services 140. In another example, a virtual compute cluster 160 may be configured to facilitate processing by virtual processing clusters 160 of a client's service on behalf of a client's customers or associates. Each cluster of virtual compute cluster 160 may be a virtual machine (VM) based cluster of computing resources. For example, a virtual compute cluster 160 may be a collection of hardware and software resources combined to mimic the functions of an operating system-based compute instance. Accordingly, the resources of each of virtual compute clusters 160(A)-160(N) may be provisioned, distributed, allocated otherwise modified in much the same manner that resources of an operating system may, without many of the unnecessary facets of an operating system included. Thus, virtual compute clusters 160(A)-160(N) provide a streamlined set of resources that may be applied to a service, such as cloud-based services 140. Each of virtual compute resources 160(A)-160(N) includes one or more virtual compute instances 161. Virtual compute instances may be individual virtual machine instances for processing data or otherwise performing compute operations.

In an example embodiment a client subscribes to a cloud-based service of cloud-based services 140 that allows the client to store the client's data on physical storage partitions of server cluster 150. Server cluster allows for storage, modification, and proliferation of the data via an interfacing protocol built into cloud-based services 140 and via network 130. The client of associates of the client may access the stored data via a client interface 120 executing on a client device 110. In order to access the data stored in server cluster 150, the client can request operations, such as reading the data, writing new data to the storage, sharing the data with other entities, etc. The processing of these requested operations can be performed by virtual compute clusters 160(A)-(N) of the server cluster 150. For example, a number of virtual compute instances 161(A)-161(M) may be allocated to server cluster 150 that stores the data specifically to handle these operations.

Figure 2:
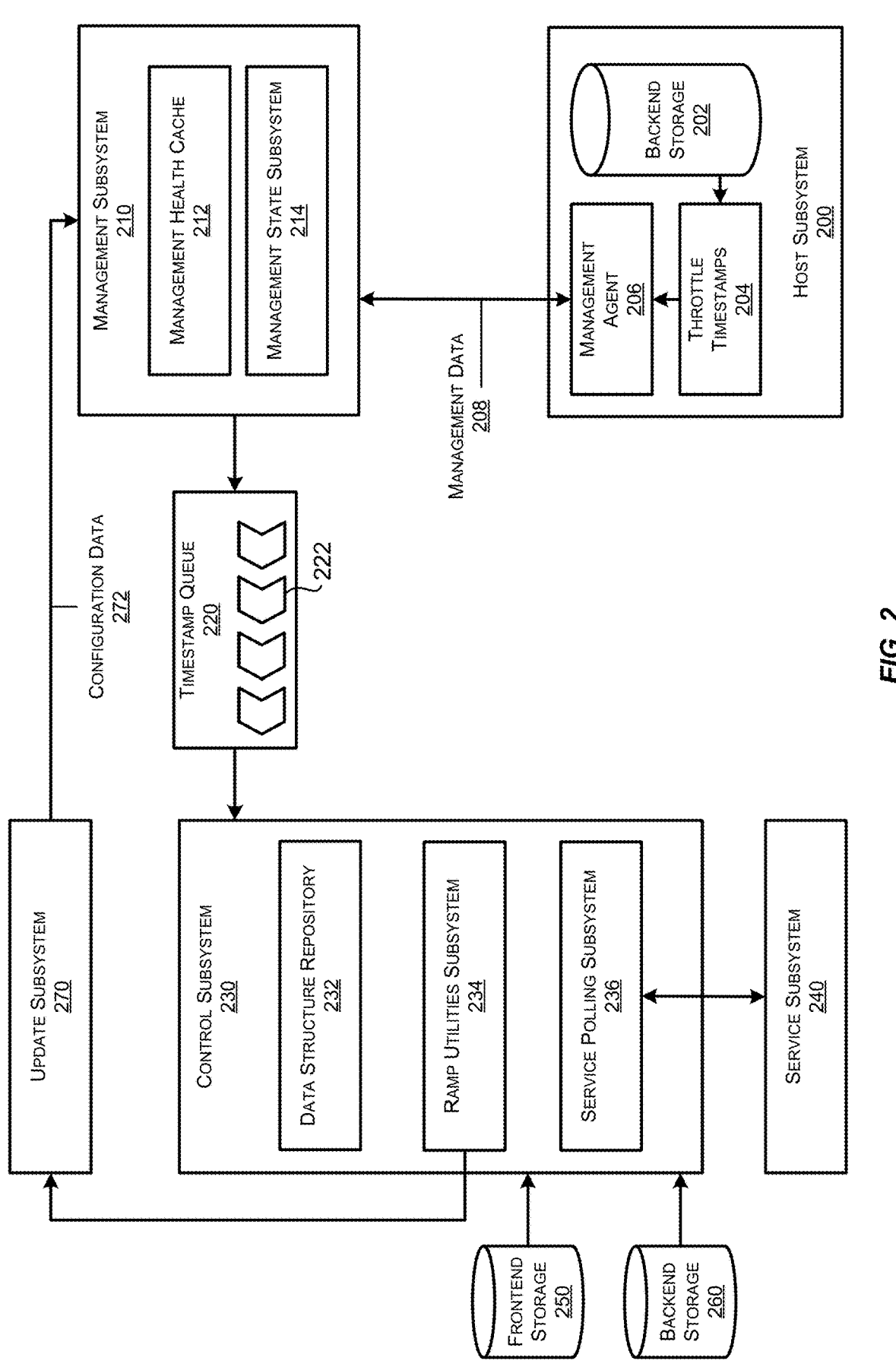
FIG. 2 is a block diagram of an example compute resource allocation system according to certain embodiments of the present disclosure.

FIG. 2 is a block diagram of an example compute resource allocation system according to certain embodiments of the present disclosure. Specifically, FIG. 2 depicts an example system utilizing subsystems for facilitation of automatic and dynamic resource allocation. The system depicted in FIG. 2 may be, for example, a system operating as part of server cluster 150 to facilitate cloud-based services 140 including utilization of virtual compute clusters 160(A)-160(N).

The system depicted in FIG. 2 includes host subsystem 200. Host subsystem 200 may be a subsystem operating as part of server cluster 150 and configured to host data within a backend storage memory. Host subsystem includes backend storage 202. Backend storage 202 may be a storage device, subsystem, or other entity configured to store, in an electronic computer memory, sets of data. For example, backend storage 202 may host and store data from one or more clients utilizing cloud-based storage services as part of cloud-based services 140. Additionally, backend storage 202 may include or otherwise utilize processing resources, such as virtual compute clusters 160(A)-160(N) to facilitate storage, access, or other processes with respect to data stored in backend storage 202. For example, host subsystem may include or be communicatively coupled to one or more virtual compute clusters 160(A)-160(N) that can facilitate read, write, and sharing processes as part of the data storage service, or that can facilitate virtual compute resources accessible to a client's customers as part of a cloud-based processing service.

As backend storage 202 contains electronic storage to store data thereon and access to processing resources associated with the electronic storage, backend storage or an associated component thereof may compare a current threshold throughput metric of processing resources to an active load metric of processing to determine a difference between the metrics. The difference may be represented as a proportion of utilization of load and/or a throttle state. A proportion of utilization may indicate a relative proportion of the threshold throughput of processing resources consumed by an active load of the processing resources. For example, a set of processing resources with a threshold maximum throughput of 50 GB/sec under an active load of 40 GB/sec can yield a proportion of utilization of 80%. A throttle state may indicate a current state of processing resources at backend storage 202 and whether the resource are currently undergoing throttling. For example, a processing resources of the backend storage 202 may regularly compare an incoming number of input/output operations per second (IOPS) and compare the IOPS to the threshold iOPS of processing resources. In some embodiments, if the IOPS are greater than the threshold, then the system is actively being throttled and a throttle state for the system may be designated "active." In some embodiments, processing resources are sorted into one or more groups or "buckets" of token resources. In this instance, throttling may occur when a processing system requires additional allocations of processing resource tokens and less tokens are available than are required. In these cases, new tokens may be allocated at a rate proportional to the threshold throughput. Each bucket of tokens may have a maximum number of tokens that may be allocated, thus determining a threshold of tokens at which throttling will occur.

In various embodiments, compute resources operating as part of backend storage 202 may be split into multiple groups for processing data in parallel. For example each of a set of computing resources, such as individual virtual computer clusters 160 or virtual compute instances 161, may be associated with a "lead" processing unit configured to intake data as an initial processor. The lead processing unit can then distribute additional compute loads to other processing units in the set of compute resources. The compute load received at the lead processing unit may corresponds to a singular processing command or operation that can be parsed in parallel by a set of processing units lead by the lead processing unit.

Host subsystem 200 may be configured to generate and store, at regular time intervals, timestamp data indicating a throttle state of the backend storage 202. For example, every single second, the processing resources of the backend storage 202 may generate a backend file including a throttle state for storage. These backend files may be collected in a repository of host subsystem 200, such as throttle timestamps 204. Host subsystem includes management agent 206, management agent 206 may be a subsystem or set of instructions configured to facilitate exchange of management data 208 to and from host subsystem 200. For example, management agent may send management data 208 at regular intervals to a management subsystem of the compute resource allocation system depicted in FIG. 2.

The compute resource allocation system depicted in FIG. 2 may further include management subsystem 210. Management subsystem 210 may be a subsystem of the computer resource allocation system configured to exchange management data with the host subsystem 200 to determine at what periods of time the backend storage 202 is experiencing throttle and set throttle limits for processing resources managing data at backend storage 202. For example, management agent 206 may send management data 208 including throttle timestamps from throttle timestamps 204 to management subsystem 210. Management subsystem 210 may utilize the management data 208 received to determine a past, present, or future state of the backend system 202. For example, management subsystem 210 may use a state determination subsystem, such as management state subsystem 214, to determine a current state of the IOPS being processed at backend storage during a period of time. Management state subsystem 214 may be further configured to determine a state of the overall backend storage 202 relating to a client, including information such as storage space available, processing resources available, proportion of active throttle states per timestamp, difference between threshold loads and active loads, etc.

In various embodiments, management subsystem 210 is a subsystem for managing the operations of host subsystem 200. For example, management subsystem 210 may include instructions for changing configurations of backend storage 202, such as a number of processing resources allocated for a computer memory available to a client. For example, based on state data generated by management state subsystem, management subsystem 210 may signal host subsystem 200 to change the configuration of backend storage or affiliate processing resources. Based on data gleaned from a control subsystem, such as control subsystem 230 and management determinations made by management subsystem 210, management subsystem 210 may send management data 208 to host subsystem 200 to allocate or deallocate processing resources according to the embodiments described herein.

Management subsystem 210 may further include management health cache 212. Management health cache 212 may be a cache of "health" related data for the management subsystem. For example, management health cache 212 may store one or more sets of data relating to historical records of compute loads, threshold loads, and/or resource allocations made at the compute resource allocation system. In various embodiments, management subsystem may utilize health data stored therein in the management health cache 212 to determine a manner in which resources can be allocated based on the historical allocations made by the system. In one example, management subsystem 210 may utilize health data stored at management health cache 212 as well as management data 208 to determine one or more recommended allocation behaviors. For example, health data may indicate that a set of processing resources has been rapidly allocated and deallocated over a relatively short period of time, which is an inefficient behavior. In response, the management subsystem 210 may determine to limit the rate at which computing resources are allocated or deallocated from a set of computing resources to handle loads. This can "smooth" the curve of allocation and deallocation to preserve computing resources and introduce additional predictability to future allocation actions.

In various embodiments, a delay may be built into a ramp-up or ramp-down allocation to prevent frequent oscillations in resource allocation. For example, a time-based delay may be introduced before the allocated processing resources for a backend storage are ramped-down to avoid situations where traffic may increase again shortly after throttling ceases. In some embodiments, new throttling will reset the delay before ramping down begins. The delay for ramping up and ramping down may be different delays.

Management subsystem 210 may send timestamp data to a control subsystem 230 through a timestamp queue 220. Timestamp queue 220 may be a queue storage subsystem or repository configured to store timestamp data, such as timestamp data 222, in a dynamic queue accessible by the control subsystem. For example, timestamp data 222 may be sent to the timestamp queue 220 in a first-in-first-out retrieval format by which control subsystem 230 may obtain the timestamp data.

Control subsystem 230 may be a client-facing subsystem of the compute resource allocation system depicted in FIG. 2. For example, control subsystem 230 may be a subsystem configured to control operation of a cloud-based service and collect information related to configurations of the cloud-based service to facilitate automatic and dynamic resource allocation. Thus, in an example configuration, host subsystem 200 is a subsystem for hosting client data as part of a cloud-based storage service, control subsystem 230 is a subsystem for interacting with the client and cloud-based service to cause determination of allocations to be made for processing resources, and management subsystem 210 is a subsystem for implementing the allocation determinations at the host subsystem 200.

Control subsystem 230 includes data structure repository 232. Data structure repository 232 may be a repository of data structures related to data sent between systems and subsystems as described herein. Specifically, data structure repository 232 may include multiple indications of data structures that the control subsystem 230 may utilize as part of the allocation processes described herein. Control subsystem 230 include ramp utilities subsystem 234. Ramp utilities 234 may be a subsystem or set of instructions configured to generate and implement allocation configurations for one or more sets of compute resources. For example, ramp utilities subsystem 234 may process timestamp data 222 from management subsystem 210 to determine a ramp-up or ramp-down configuration for a set of processing resources operating at backend storage 202.

Control subsystem 230 includes service polling subsystem 236. Service polling subsystem 236 may be a subsystem configured to facilitate communication between a cloud-based service and control subsystem 230. For example, a cloud-based services 140 may be communicatively coupled to control subsystem via service polling subsystem 236 to facilitate data exchange between the cloud-based services 140 and control subsystem 230. Service polling subsystem 236 may be configured to receive configuration data from a client interacting with the cloud-based service. For example, service polling subsystem 236 may periodically or responsively receive signals from an interface such as client interface 120 including configuration data. In various embodiments, the configuration data received includes a modification range corresponding to a minimum and maximum threshold of processing resources that may be allocated to a set of processing resources managing backend storage 202.

Control subsystem 230 may be communicatively coupled to service subsystem 240, which may be a subsystem configured for facilitating a cloud-based service. For example, service subsystem 240 may be a subsystem configured to execute a service that can automatically and dynamically determine allocations to be made to a specific service. For example, service subsystem 240 may facilitate a cloud-based service that operates as part of cloud-based services 140. The cloud-based service facilitated by service subsystem 240 may be configured to allow a client to send client-specified configuration data to control subsystem 230. For example, a client, through client interface 120, may interact with a cloud-based service of cloud-based services 140. The cloud-based service may be implemented by service subsystem 240, which is actively polled by service polling subsystem 236 to interpret and forward data related to the client's interactions.

Control subsystem 230 may be coupled to one or more storage instances. For example, control subsystem 230 may be coupled to frontend storage 250 and/or backend storage 260. Frontend storage 250 and backend storage 260 may be storage repositories configured to store data related to information for facilitating a client-facing service and a server-facing service respectively. Control subsystem may be coupled to an update subsystem 270. Update subsystem 270 may be a subsystem configured to route configuration data 272 from control subsystem 230 to management subsystem 210. For example, after control subsystem has determined an allocation of processing resources to be made at backend storage 202, data indicating the determination may be sent to update subsystem 270. Update subsystem 270 may then generate configuration data relating to a new configuration of processing resources to be implemented by backend storage 202. For example, management subsystem 210 may utilize the received configuration data 272 to cause altering the configuration of backend storage 202 through management agent 206 at host subsystem 200.

Figure 3:
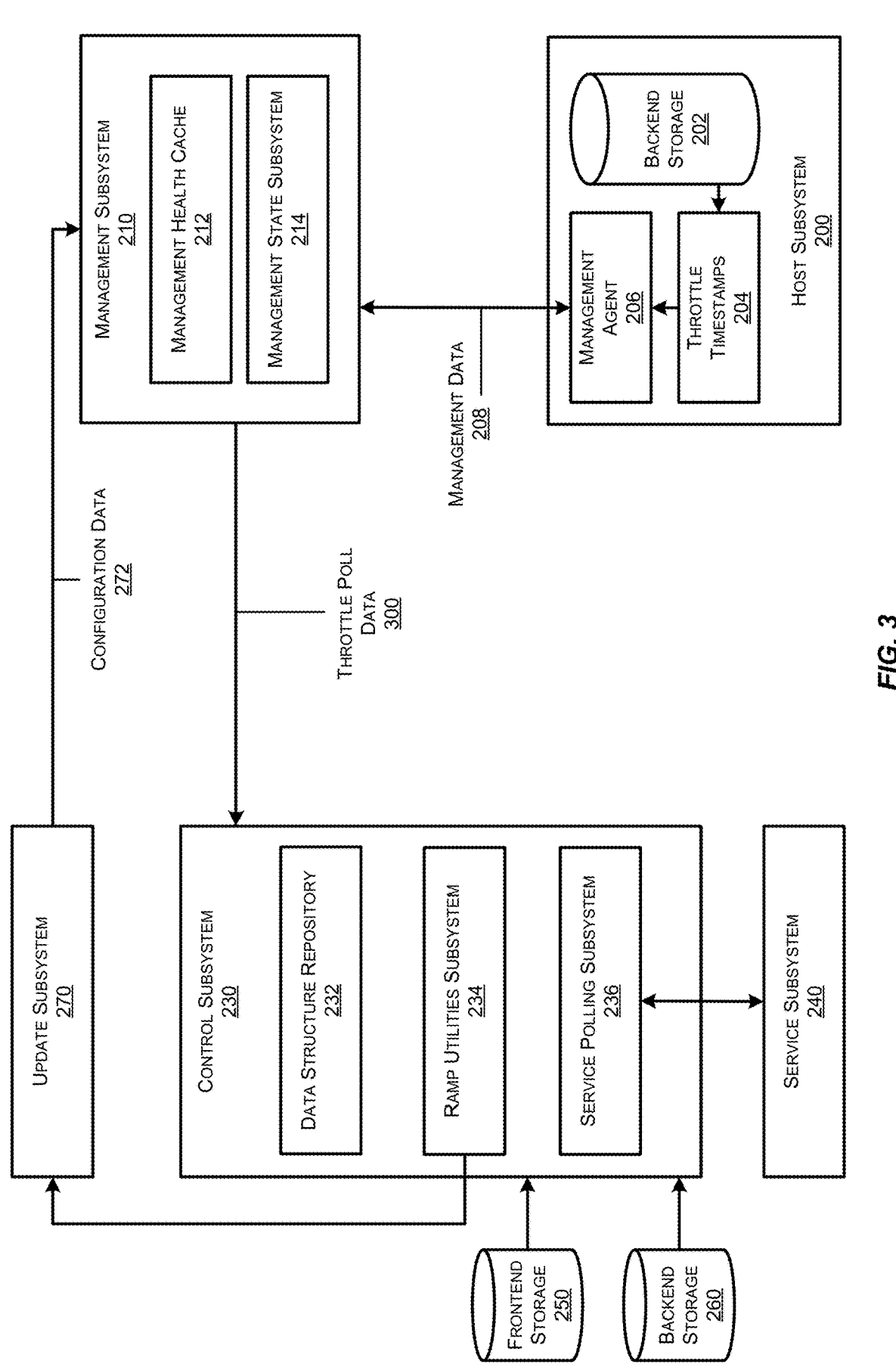
FIG. 3 is a block diagram of another example compute resource allocation system according to certain embodiments of the present disclosure.

FIG. 3 is a block diagram of another example compute resource allocation system according to certain embodiments of the present disclosure. Specifically, FIG. 3 depicts a configuration of the example compute resource allocation system depicted in FIG. 2, but instead implementing a throttle polling process between control subsystem 230 and management subsystem 210. Specifically, control subsystem 230 may periodically poll management subsystem 210 for data related to throttle events. This data may be transmitted as throttle poll data generated in response to the polling of management subsystem 210 by control subsystem 230. The throttle data 300 may be indicative of a throttling state detected at backend storage 202. Control subsystem 230 may utilize the throttle poll data 300 with additional information polled from service subsystem 240 to determine an allocation of processing resources to handle a throttling event detected at backend storage 202. For example, control subsystem 230 may determine a set of resources to be allocated to handle the throttle event and send allocation data to update subsystem 270. Update subsystem 270 may then generate configuration data based on the allocation data, the configuration data relating to a new configuration of processing resources to be implemented by backend storage 202. Management subsystem 210 may send the configuration data or data derived therefrom to host subsystem 200 to alter the processing configuration at backend storage 202.

Figure 4:
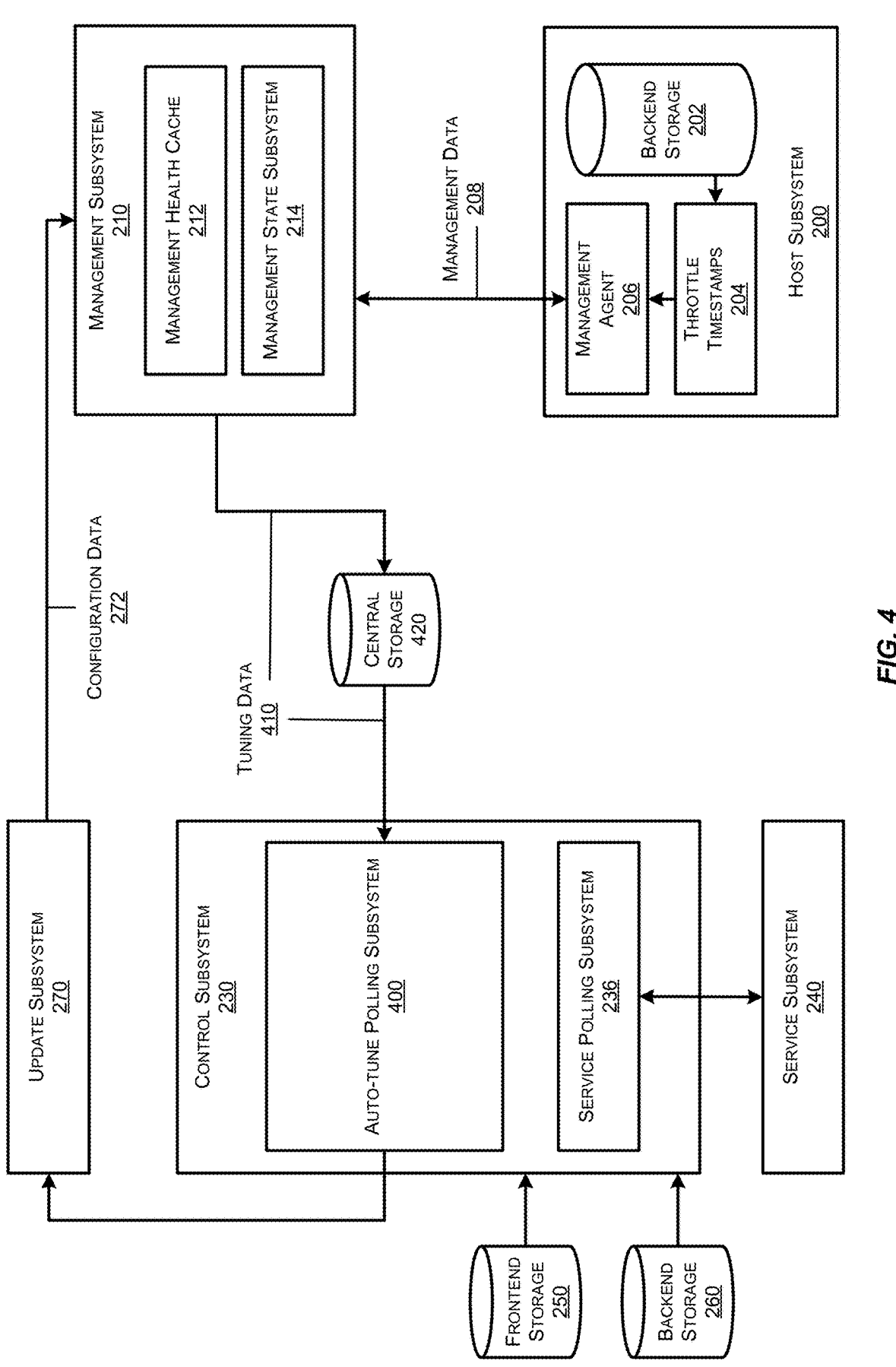
FIG. 4 is a block diagram of another example compute resource allocation system according to certain embodiments of the present disclosure.

FIG. 4 is a block diagram of another example compute resource allocation system according to certain embodiments of the present disclosure. Specifically, FIG. 4 depicts a configuration of the example compute resource allocation system depicted in FIG. 2, but instead implementing a central storage repository for facilitating auto-tune determinations. As depicted in FIG. 4, control subsystem 230 includes service polling subsystem 236 to poll service subsystem 240, as well as auto-tune polling subsystem 400. Management subsystem 210 may utilize components therein to generate auto-tune data based on a state of backend storage 202 and store the data in central storage 420.

Auto-tune data may be, for example, information regarding one or more past, present, or future states of the backend storage and/or corresponding processing rates for "tuning" the resources of backend storage based on a current or expected load. The auto-tune data may include, for example, pairs of device IDs relating to devices for storing/processing data. This data may be generated by management subsystem 210 as tuning data 410. Auto-tune polling subsystem 400 may poll the tuning data 410 stored at central storage 420 after it has been received from management subsystem 210. The tuning data 410 from central storage 420 and additional polled data from service subsystem 240 may be utilized by control subsystem 230 to determine an allocation of processing resources to be made at backend storage 202. Data indicating the determination may be sent to update subsystem 270. Update subsystem 270 may then generate configuration data relating to a new configuration of processing resources to be implemented by backend storage 202.

Figure 5:
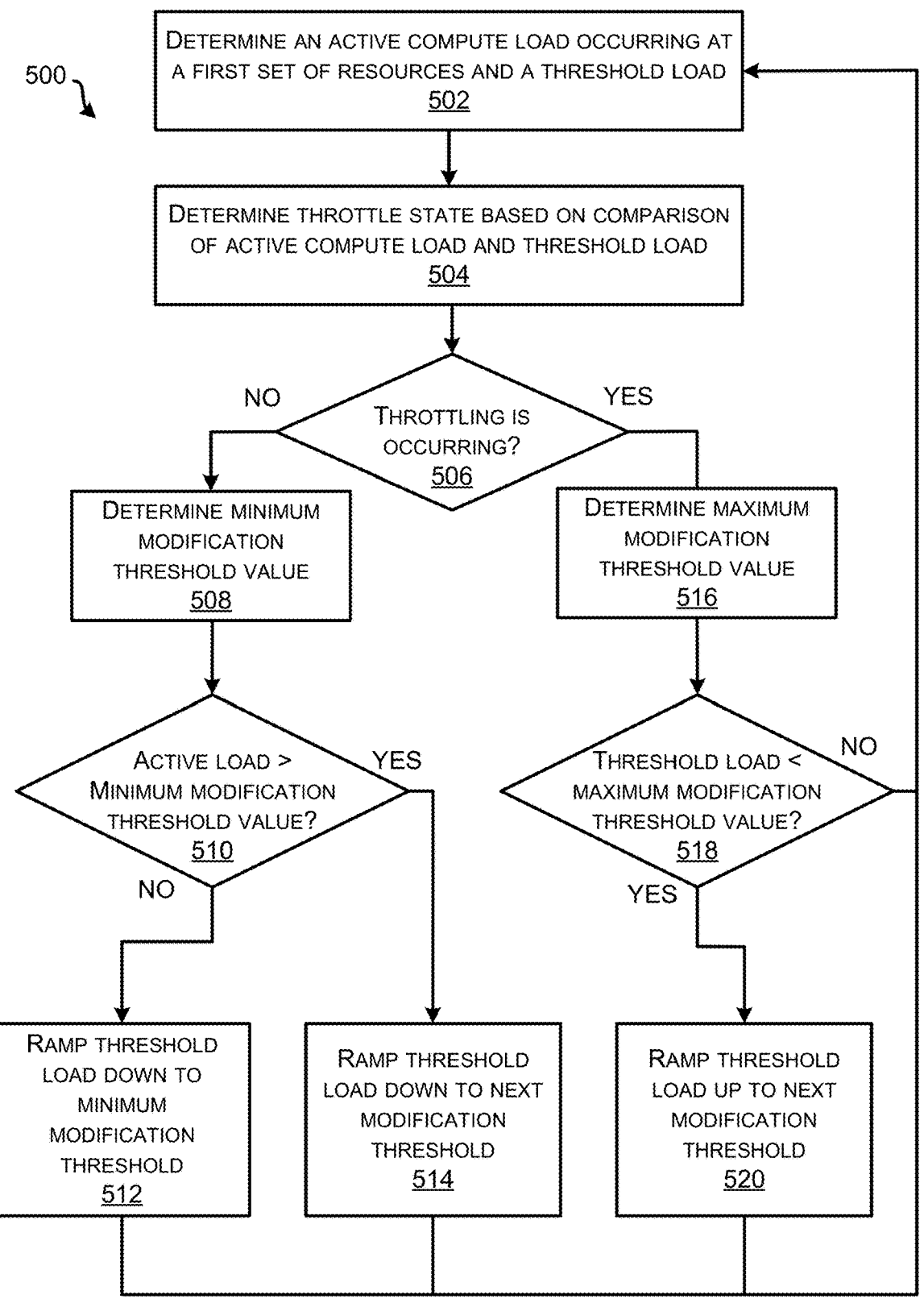
FIG. 5 depicts an example flowchart of a process for compute resource allocation according to certain embodiments of the present disclosure.

FIG. 5 depicts an example flowchart of a process for compute resource allocation according to certain embodiments of the present disclosure. Specifically, FIG. 5 depicts an example flowchart of a process 500 for automatically and dynamically allocating compute resources based on active compute loads. Process 500 begins at step 502 when an active compute load occurring at a first set of resources and a threshold load are determined. The threshold load may be a maximum throughput of processing resources implemented for a particular set of storage operating at a backend storage on behalf of a client. An active compute load may be a current load of processing for read, write, and sharing operations. For example, a client may subscribe to a service provider's cloud-based service that provide cloud-based storage space for the client's data to be hosted. As part of the subscription, or as part of a separate subscription. The service provider may provide a first set of resources that can process read, write, and sharing process instructions for accessing the stored data. The threshold load is the maximum throughput of the first set of resources for processing the instructions and the active compute load is a current load of instructions being processed by the first set of resources during a first time period.

In various embodiments, the active compute load is determined by a backend storage or a subsystem that monitors a backend storage where the client's data is stored. For example, backend storage 202 or a corresponding processing subsystem may include the first set of resources. A polling subsystem, such as host subsystem 200 or management subsystem 210 may poll the processing resources at regular intervals to determine the active compute load. The same subsystems may have access to information regarding a currently implemented allocation of the first compute resources. For example, as part of a timestamp generation process, a timestamp generator subsystem may poll the backend storage and/or processing resources to determine the active compute load and a last-known state of the threshold load. This information may be saved as timestamp information at throttle timestamps 204.

At step 504, a throttle state based on a comparison of the active compute load and the threshold load is determined. Specifically, the active compute load and the threshold load determined in 502 may be compared to determine a difference between each value. For example, a difference calculation may be performed to determine the exact difference or a proportional difference between the values of active compute load and the threshold load. The difference determined may be used to generate data relating to a throttle state of the first set of computing resources. For example, if it is determined that a difference between the active compute load (the amount of processing instructions to access the data received by the backend storage over a given period of time) and the threshold load (the expected maximum throughput of the first set of processing resources over a given time period) if less than zero (in configurations where the threshold load is subtracted from the active compute load) then the system is currently undergoing throttling (more processing instructions are being received at the backend storage than the first set of processing resources is capable of processing in a given period of time when utilized at maximum throughput). If the difference is zero or greater, then the first set of resources if not experiencing throttling, as the first set of computing resources are determined to be capable of processing the active compute load in the given time period. The difference value may be used to determine a "throttle state," or an indication of whether throttling is occurring based on the comparison. In various embodiments, the difference calculated may be preserved as part of the throttle state for future steps of process 500.

At step 506, a decision is made as to whether throttling is occurring. The decision may be made based at least in part on the throttle state determined in step 504. For example, the throttle state may include a Boolean value indicating whether throttling is occurring at the first set of computing resources during a current time period.

At step 508, it is decided that no throttling is occurring, a minimum modification threshold value is determined. Specifically, if it is determined, based at least in part on the throttle state determined in 504, that the first set of resources is capable of processing the active load during a time period, more resources are allocated in the first set of resources than are needed to process the active compute load in the present and possibly in the near future. In response to the decision that throttling is not occurring, the minimum modification value is determined in order to determine a configuration for deallocating resources from the first set of resources.

In various embodiments, the minimum modification threshold value is a lower bound of a range of processing resource specified by a client utilizing a cloud-based storage service. For example, a client may set the range of processing resources based on a client-selected range of permissible modification that may be made during resource allocation processes. The lower bound of the range may represent a minimum amount of resources that a client specifies shall always be allocated to their storage at any given time, a minimum price of a subscription that a client is engaged in to process their data the backend storage, etc. For example, a client may determine that it is financially beneficial not to pay for a default level of a subscription including processing resources during a period of lower traffic to the client resources. However, the client may still determine that it is beneficial to preserve a minimum level of processing resources at any given time to preserve a minimum level of throughput to its customers that access the data using the cloud-based service. Thus the customer may set the lower bound of resources that may be in the first set of resources with the expectation that at any given time, the amount of resources in the first set of processing resources are not less than this lower bound.

At step 510, a decision is made if the minimum modification threshold value is less than the active compute load. The decision may be based at least in part on a comparison between the minimum modification threshold value determined in step 508 and the active compute load determined in step 502. The comparison may include, as described above, a difference calculation for determining a difference between the active compute load and the minimum modification threshold value. The decision in 510 corresponds to a determination of whether the minimum modification threshold value (i.e., a minimum level of computing resources in the first set of resources) is capable of processing the active load with maximum throughput. For example, if throttling is not occurring and the active load is less than the minimum modification value determined in step 508, then it is beneficial to deallocate resources from the first set of resources until the minimum modification threshold value of resources in in the first set of resources in order to reduce unnecessary resource allocations without leaving less resources than the customer has specified are necessary to process their data at a given time.

Accordingly, at step 512, if it is decided that the minimum modification threshold is not less than the active load (i.e., the minimum modification threshold is greater than or equal to the active compute load and can thus process the active compute load even in its minimum resource state), the threshold load is "ramped down" to the minimum modification threshold. As described above, ramping down the threshold load down may include periodically deallocating resources from the first set of resources until a new target threshold of processing resources is reached. For example, ramping down a threshold may include deallocating VPUs from a set of VPUs for processing data until the total throughput of the set VPUs remaining in the first set of resources has reached the minimum modification threshold of VPU throughput to process active compute loads. It will be appreciated that deallocation of resources may include processes where the allocation of resources is changed prior to reaching the modification threshold. For example, the threshold load may be ramped down to the minimum modification threshold over five time periods. At the third time period, it may be determined that the current compute load is now higher than the minimum modification value. This may stop the ramping down process or change the manner in which the first set of resources are ramped down.

At step 514, if instead it is decided that the minimum modification threshold is less than the active load (i.e., the active compute load cannot be processed with full throughput of the minimum modification threshold value), the threshold load is ramped down to a next modification threshold that is not the minimum modification threshold value. Specifically, resources may be deallocated from the first set of resources down to a "next level" that is not the minimum modification threshold. In various embodiments, the next modification threshold may be a set decrement level of processing resources during a ramp-down action (e.g., deallocate 50 VPUs every time period). In various embodiments, the next modification threshold is determined by a difference between the active compute load and the threshold load determined in 504, and saved as part of the throttle state.

Returning to the decision at step 506, if it is instead decided that throttling is occurring based at least in part on the throttle state determined in 504, the process proceeds to step 516, where a maximum modification threshold value is determined. Specifically, if it is determined, based at least in part on the throttle state determined in 504, that the first set of resources is not capable of processing the active load during a time period less resources are allocated in the first set of resources than are needed to process the active compute load in the present and possibly in the near future. This means that incoming processing instructions, such as read, write, and share operations, and/or cloud-based processing resources operated on behalf of a client-service, can be backlogged in the backend storage until the processing resources may process them at a future time period. In response to the decision that throttling is occurring, the maximum modification value is determined in order to determine a configuration for allocating resources for the first set of resources.

In various embodiments, the maximum modification threshold value is an upper bound of a range of processing resource specified by a client utilizing a cloud-based storage service. For example, a client may set the range of processing resources based on a client-selected range of permissible modification that may be made during resource allocation processes. The upper bound of the range may represent a maximum amount of resources that a client specifies shall may be allocated to their storage at any given time, a maximum price of a subscription that a client is willing to accept in order to process their data at the backend storage, etc. For example, a client may determine that it is financially beneficial not to pay for a subscription-based level of computing resources, even if potential throttling of the first set of resources is throttled. Thus the customer may set the upper bound of resources that may be in the first set of resources with the expectation that at any given time, the amount of resources in the first set of processing resources is not more than this upper bound.

At step 518, a decision is made if the maximum modification threshold value is greater than the threshold load. The decision may be based at least in part on a comparison between the maximum modification threshold value determined in step 516 and the threshold load determined in step 502. The comparison may include, as described above, a difference calculation for determining a difference between the threshold load and the maximum modification threshold value. The decision in 518 corresponds to a determination of whether the threshold load is capable of accepting more allocated resources without exceeding the maximum modification threshold value determined in step 516. For example, if throttling is occurring and the threshold load is already equal to the maximum modification value determined in step 516, then no further resource may be allocated to the threshold load to resolve throttling based on the client-specified range of permissible modification values. Accordingly, if the decision is that the maximum modification threshold value is not greater than the threshold load, the process returns to step 502 without performance of any allocation or ramping.

At step 520, if the decision is that the maximum modification threshold value is greater than the threshold load (i.e., there are less resources in the first set of resources than may be allocated under the maximum modification threshold), the threshold is "ramped up" to the next modification threshold. As described above, ramping up the threshold load down may include periodically allocating resources into the first set of resources until a new target threshold of processing resources is reached. For example, ramping up a threshold may include allocating VPUs from a pool of available VPUs for processing data until the total throughput of the set VPUs remaining in the first set of resources has reached the a new level of throughput, for example the maximum modification threshold itself. It will be appreciated that allocation of resources may include processes where the allocation of resources is changed prior to reaching the modification threshold. For example, the threshold load may be ramped up to the maximum modification threshold over fifty time periods in response to determining the presence of throttling. At the thirtieth time period, it may be determined that the current compute load is now lower than the current threshold load and that a backlog of processing instructions has been cleared. This may stop the ramping up process or change the manner in which the first set of resources are ramped up.

Following any of steps 512, 514, 520, or a decision in 518 that the maximum modification threshold value is not greater than the threshold load (i.e., the maximum modification threshold value is less than or equal to the threshold load), the process 500 proceeds back to block 502, where a new active compute load and a new threshold load is determined.

In an example embodiment of FIG. 5, a customer pays for a subscription service in which they store 1 TB of cloud-based data storage and are given a default allocation of 10 VPU/GB for processing the customers data. Each VPU may process a static 1 MB/sec of data. The customers allocated default processing resources may thus process up to 10 GB/sec of data in throughput. The customer sets a permissible allocation range of 5 VPU/GB as a lower bound and 20 VPU/GB as an upper bound.

At a first time period, it is determined that the active compute load of instructions received at the set of processing resources is 20 GB/sec. A compute resource allocation system determines that the default allocation of 10 VPU/GB is undergoing throttling and determines to ramp up the allocation to 20 VPU/GB to handle the throttle. The newly ramped-up allocation may process up to 20 GB/sec. The service provider may determine to charge the customer an additional subscription fee for the use of additional allocated VPUs.

At a second time period, it is determined that the active compute load of instructions received at the set of processing resources is 30 GB/sec. A compute resource allocation system determines that the current allocation of 20 VPU/GB is equal to the upper bound of the permissible allocation range set by the customer. The processing resources are not ramped up to meet the throttling in accordance with the customer's specifications.

At a third time period, it is determined that the active compute load of instructions received at the set of processing resources is 7 GB/sec. A compute resource allocation system determines that throttling is not occurring and that the current allocation of 20 VPU/GB is far more allocated resources than are necessary to handle the active compute load. The system may further determine that the active compute load of 7 GB can require an allocation of at least 7 VPU/GB to process the active compute load. The processing resources are responsively ramped down to 7.5 VPU/GB, and a corresponding maximum throughput of 7.5 GB/sec, to better match the active compute load, but without ramping down to the lower bound of the permissible allocation range set by the customer to avoid throttling.

At a fourth time period, it is determined that the active compute load of instructions received at the set of processing resources is 2 GB/sec. A compute resource allocation system determines that throttling is not occurring and that the current allocation of 7.5 VPU/GB is far more allocated resources than are necessary to handle the active compute load. The system may further determine that the active compute load of 2 GB is less than the lower bound of the permissible allocation range set by the customer. The processing resources are responsively ramped down to 5 VPU/GB to match the lower bound in accordance with the customer's configuration. The service provider may provide a discount on subscription prices to compensate the customer for freeing up valuable VPUs that other customers may use in their own allocations.

Figure 6:
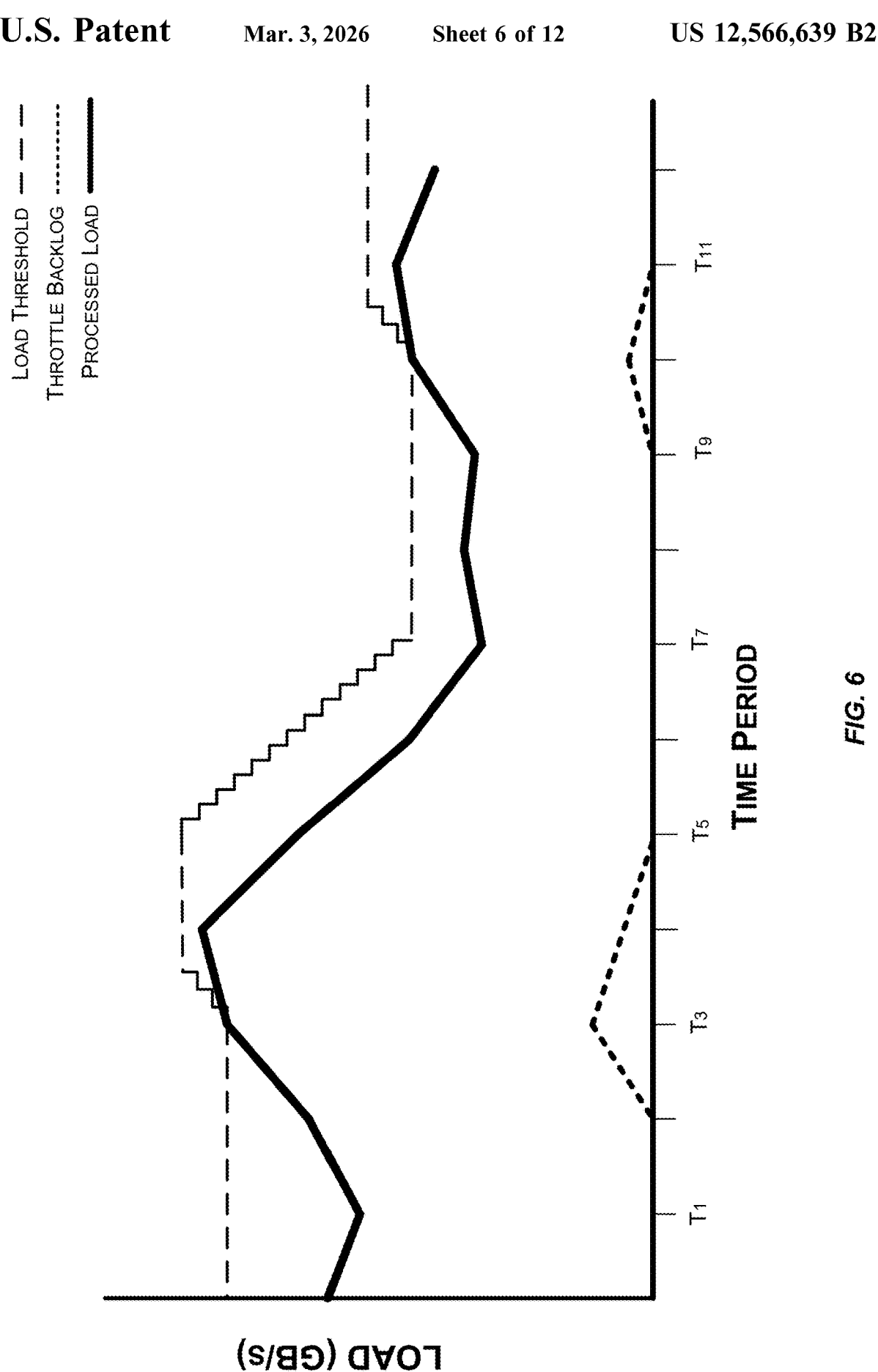
FIG. 6 depicts an example graphic representation of a compute resource allocation over a time period according to certain embodiments of the present disclosure.

FIG. 6 depicts an example graphic representation of compute resource allocation over a time period according to certain embodiments of the present disclosure. Specifically, FIG. 6 represents a time and resource-based graph showing how a load threshold (a maximum expected throughput of a set of computing resources allocated to a client) may be modified automatically and dynamically to meet a processed load (an active compute load of instructions received by the resources) and clear throttle backlogs (a backlog of instructions received by the processing resources that should be queued during throttling of the resources).

As depicted in FIG. 6, over several first time periods (T1 and T2) a load threshold is kept constant and the processed load changes dynamically. After a time period T3, it is determined that throttling is occurring when the processed load exceeds the load threshold. Accordingly, a throttle backlog has built up that should be cleared. In response, during time period T4, the load threshold is ramped up with additional VPUs/GB to meet the processed load. Accordingly, over time periods T4 and T5, the processed load is less than the newly allocated load threshold and the throttle backlog is cleared. After time period T5, it is determined that the load threshold is far more than the current processed load. Accordingly, over timer periods T6 and T7, the load threshold is ramped down to deallocated valuable VPUs to other clients of the cloud-based service when the processed load is not throttling the processing resources. The load threshold is held constant through time period T10 while the processed load is less than the load threshold.

Following time period T10, it is determined that throttling is occurring when the processed load exceeds the load threshold. Accordingly, a throttle backlog has built up that should be cleared. In response, during time period T11, the load threshold is ramped up with additional VPUs/GB to meet the processed load. Accordingly, over time period T11, the processed load is less than the newly allocated load threshold and the throttle backlog is cleared.

Figure 7:
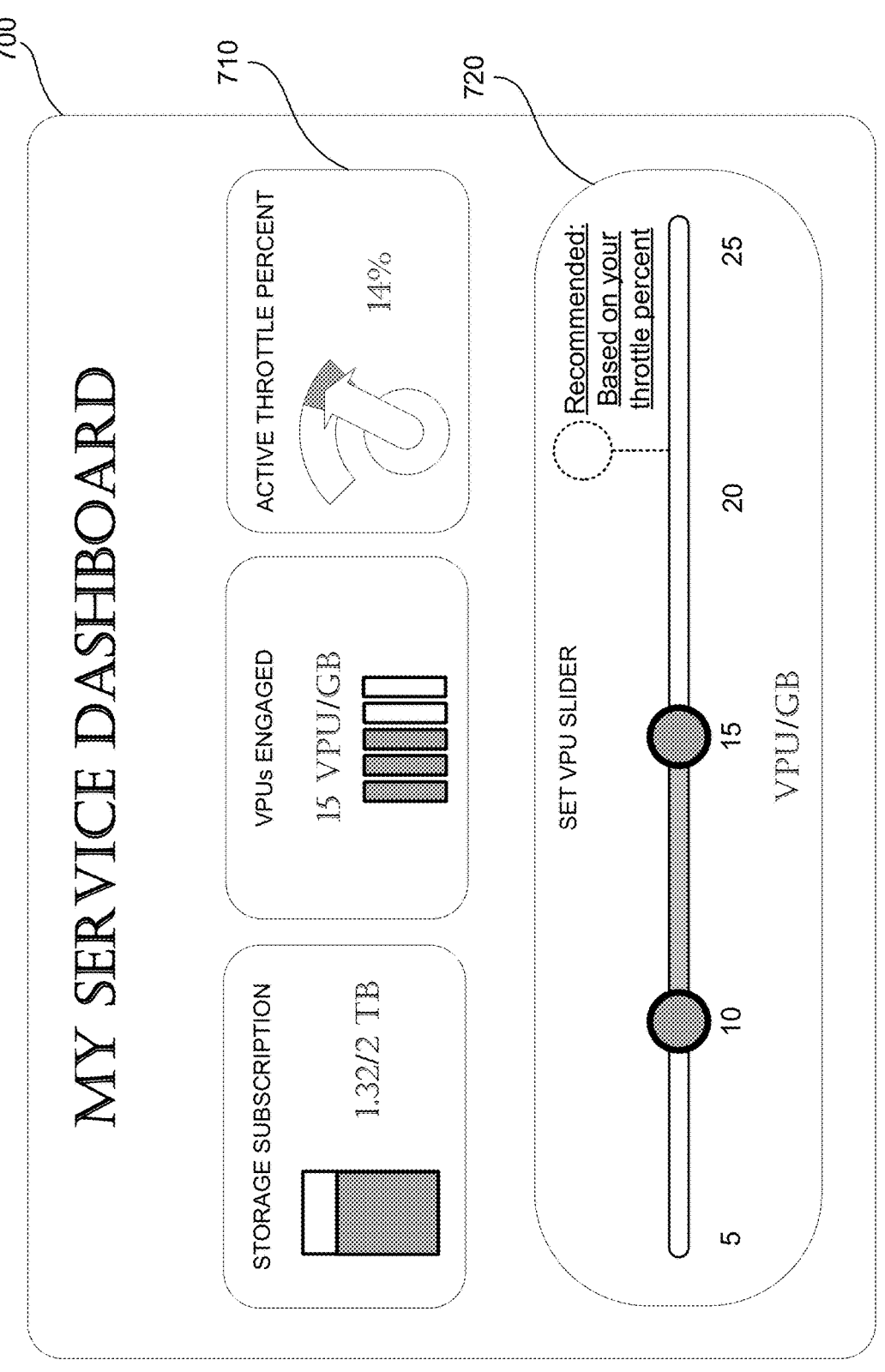
FIG. 7 depicts an example graphical interface and dashboard for user utilization of compute resource allocation and recommendations according to certain embodiments of the present disclosure.

FIG. 7 depicts an example graphical interface and dashboard for user utilization of compute resource allocation and recommendations according to certain embodiments of the present disclosure. Specifically, FIG. 7 depicts an example dashboard interface generated according to the embodiments described herein. As depicted in FIG. 7, an interface 700 may display a component dashboard populated by a number of components 710. For example, the interface 700 may comprise a number of visual components such as component 710 which a client may view and interact with. Component 710, as depicted in FIG. 7, is a widget-style component displaying an information related to a compute load measured at a cloud-based service.

Interface 700 may be an interface, such as client interface 120, that a client may utilize to set permissible modification limits for automatic and dynamic allocation and view aspects of a cloud-based service that the client utilizes. For example, interface 700 is titled "MY SERVICE DASHBOARD" and includes components 710 relating to the performance of the client's cloud-based service. For example, a first components lists an amount of data stored on the client behalf at a cloud-based storage medium under the header "STORAGE SUBSCRIPTION" and a visual representation of an amount of stored data relative to a total amount of storage space offered by a service provider under a particular subscription plan.

Another component shows a number of VPUs currently allocated to processing instructions sent to the backend server under the header VPUs engaged" and a visual representation of a number of VPUs currently engaged compared to a total number of VPUs that may be engaged by the service provider at a given time. Component 710 shows a percent of time periods during which throttle is occurring relative to a total number of time periods measured under a header "ACTIVE THROTTLE PERCENT." For example, the depiction in component 710 may indicate that in 14% of all time periods captured in timestamp data, the allocated resources are throttled by the active load. A corresponding visual indicator shows the relative percentage is high and is likely impacting the service and causing negative behaviors to occur with respect to accessing the client's data.

Interface 700 may further include a range slider component 720, which may be a component including an interactive slider. A client may utilize the interactive slider to set a permissible modification range for VPU/GB allocations for processing resources. Range slide component 720 is depicted with a header of "SET VPU SLIDER" and an interactive slider that includes interactive input indicators for lower and upper bounds of a range. The input indicators may be moved along a sliding scale so that the customer may set and modify the set range. In various embodiments, the systems described herein may generate one or more recommendations modification values within the range that should be set. For example, as depicted in FIG. 7 range slider component 720 may include a recommended modification value to include in the modification range based on determinations made regarding the allocated resources. For example, the system may determine, based on a timestamp and throttling data collected during previous time periods, and average active load throughput value. An upper/lower bound may be recommended based on the average load throughput value, for example, as bounds of resource allocations two standard deviations above and below the average load value respectively.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model can require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network can be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code can be deployed must first be set up. In some instances, the provisioning can be done manually, a provisioning tool may be utilized to provision the resources, and/or deployment tools may be utilized to deploy the code once the infrastructure is provisioned.

Figure 8:
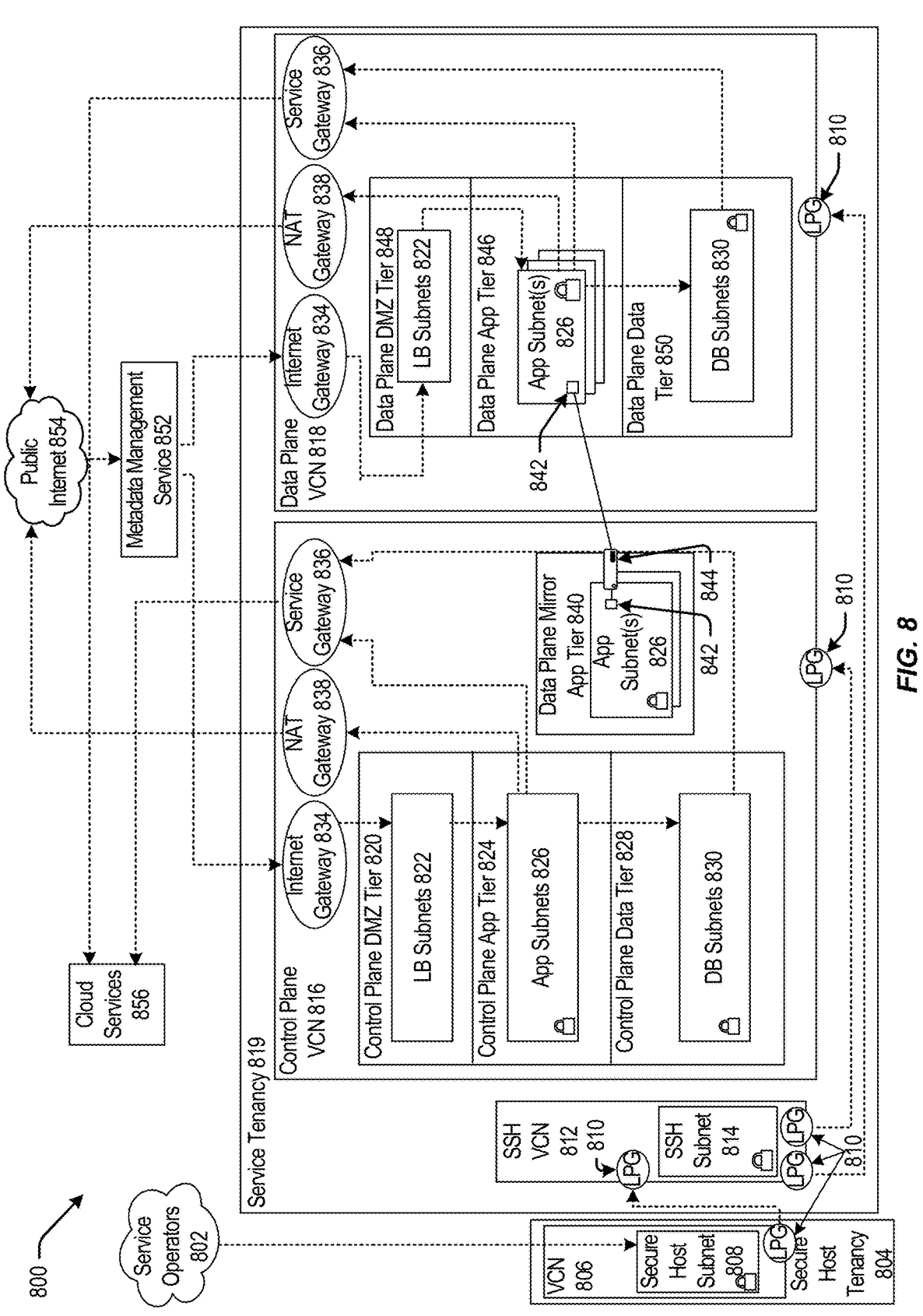
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep security breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively coupled to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of security, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
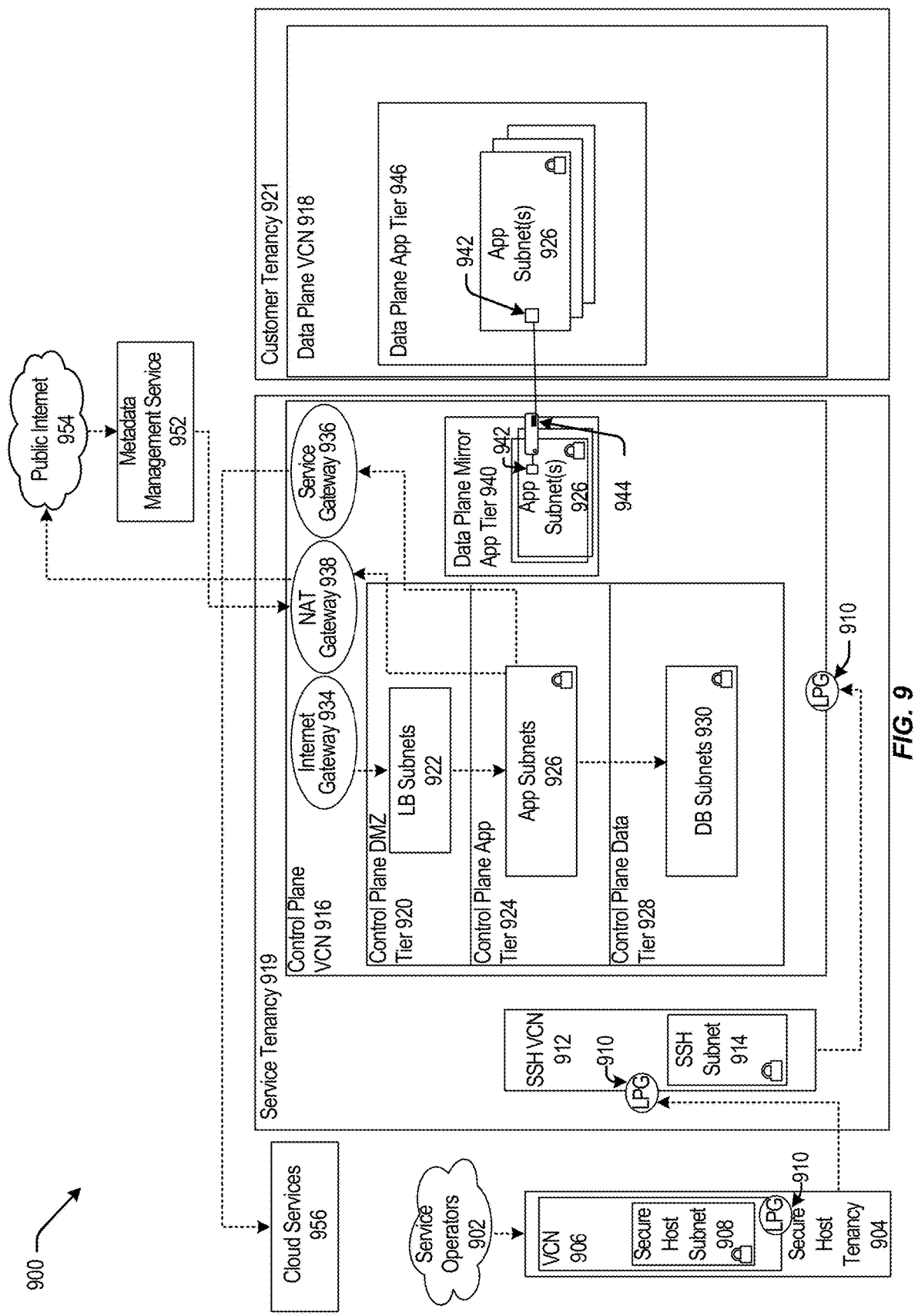
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 802 of FIG. 8) can be communicatively coupled to a secure host tenancy 904 (e.g. the secure host tenancy 804 of FIG. 8) that can include a virtual cloud network (VCN) 906 (e.g. the VCN 806 of FIG. 8) and a secure host subnet 908 (e.g. the secure host subnet 808 of FIG. 8). The VCN 906 can include a local peering gateway (LPG) 910 (e.g. the LPG 810 of FIG. 8) that can be communicatively coupled to a secure shell (SSH) VCN 912 (e.g. the SSH VCN 812 of FIG. 8) via an LPG 810 contained in the SSH VCN 912. The SSH VCN 912 can include an SSH subnet 914 (e.g. the SSH subnet 814 of FIG. 8), and the SSH VCN 912 can be communicatively coupled to a control plane VCN 916 (e.g. the control plane VCN 816 of FIG. 8) via an LPG 910 contained in the control plane VCN 916. The control plane VCN 916 can be contained in a service tenancy 919 (e.g. the service tenancy 819 of FIG. 8), and the data plane VCN 918 (e.g. the data plane VCN 818 of FIG. 8) can be contained in a customer tenancy 921 that may be owned or operated by users, or customers, of the system.

The control plane VCN 916 can include a control plane DMZ tier 920 (e.g. the control plane DMZ tier 820 of FIG. 8) that can include LB subnet(s) 922 (e.g. LB subnet(s) 822 of FIG. 8), a control plane app tier 924 (e.g. the control plane app tier 824 of FIG. 8) that can include app subnet(s) 926 (e.g. app subnet(s) 826 of FIG. 8), a control plane data tier 928 (e.g. the control plane data tier 828 of FIG. 8) that can include database (DB) subnet(s) 930 (e.g. similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g. the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g. the service gateway of FIG. 8) and a network address translation (NAT) gateway 938 (e.g. the NAT gateway 838 of FIG. 8). The control plane VCN 916 can include the service gateway 936 and the NAT gateway 938.

The control plane VCN 916 can include a data plane mirror app tier 940 (e.g. the data plane mirror app tier 840 of FIG. 8) that can include app subnet(s) 926. The app subnet(s) 926 contained in the data plane mirror app tier 940 can include a virtual network interface controller (VNIC) 942 (e.g. the VNIC of 842) that can execute a compute instance 944 (e.g. similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g. the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g. the metadata management service 852 of FIG. 8) that can be communicatively coupled to public Internet 954 (e.g. public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g. cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918, but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN

918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
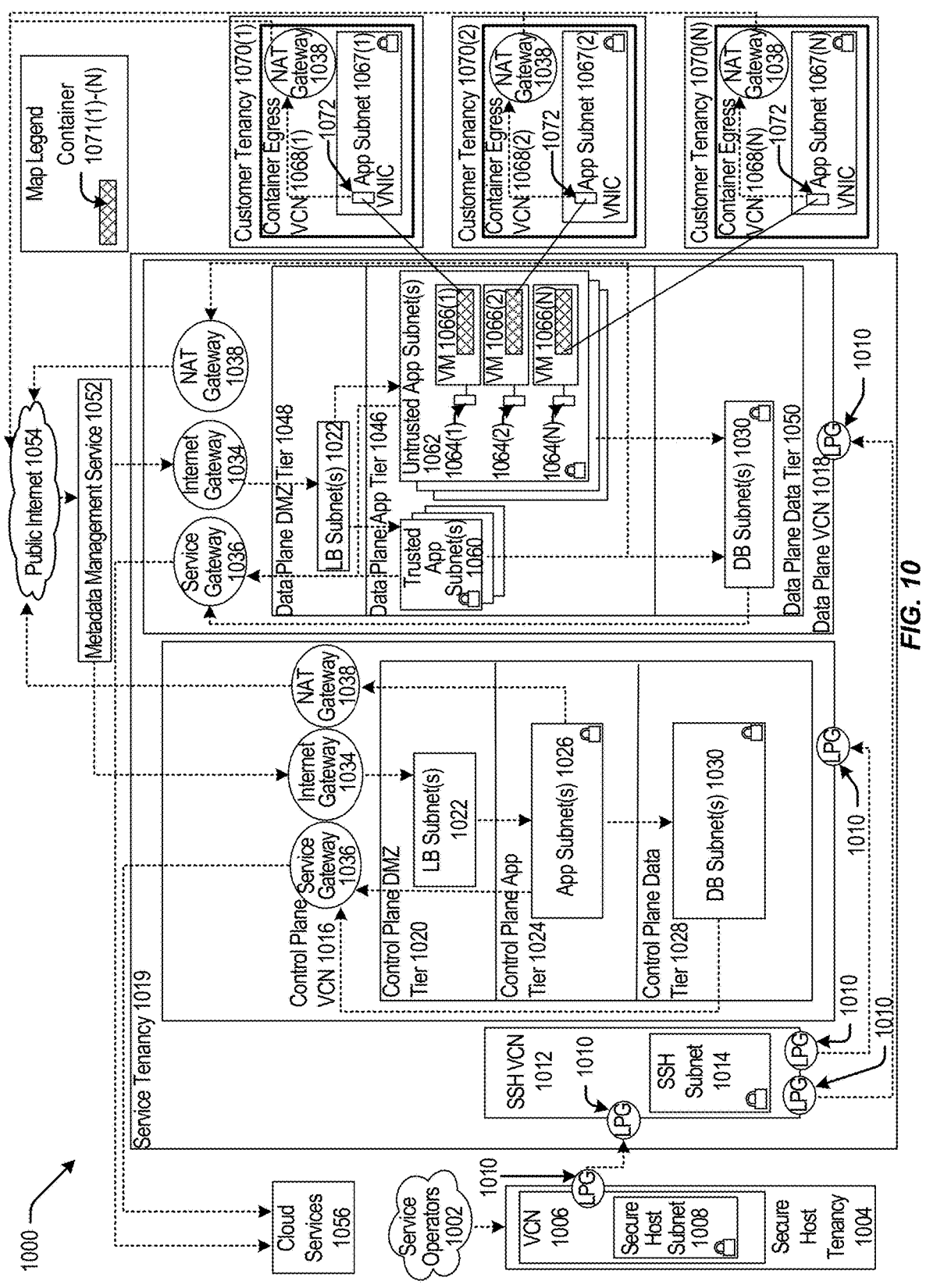
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 802 of FIG. 8) can be communicatively coupled to a secure host tenancy 1004 (e.g. the secure host tenancy 804 of FIG. 8) that can include a virtual cloud network (VCN) 1006 (e.g. the VCN 806 of FIG. 8) and a secure host subnet 1008 (e.g. the secure host subnet 808 of FIG. 8). The VCN 1006 can include an LPG 1010 (e.g. the LPG 810 of FIG. 8) that can be communicatively coupled to an SSH VCN 1012 (e.g. the SSH VCN 812 of FIG. 8) via an LPG 1010 contained in the SSH VCN 1012. The SSH VCN 1012 can include an SSH subnet 1014 (e.g. the SSH subnet 814 of FIG. 8), and the SSH VCN 1012 can be communicatively coupled to a control plane VCN 1016 (e.g. the control plane VCN 816 of FIG. 8) via an LPG 1010 contained in the control plane VCN 1016 and to a data plane VCN 1018 (e.g. the data plane 818 of FIG. 8) via an LPG 1010 contained in the data plane VCN 1018. The control plane VCN 1016 and the data plane VCN 1018 can be contained in a service tenancy 1019 (e.g. the service tenancy 819 of FIG. 8).

The control plane VCN 1016 can include a control plane DMZ tier 1020 (e.g. the control plane DMZ tier 820 of FIG. 8) that can include load balancer (LB) subnet(s) 1022 (e.g. LB subnet(s) 822 of FIG. 8), a control plane app tier 1024 (e.g. the control plane app tier 824 of FIG. 8) that can include app subnet(s) 1026 (e.g. similar to app subnet(s) 826 of FIG. 8), a control plane data tier 1028 (e.g. the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 8) and a network address translation (NAT) gateway 1038 (e.g. the NAT gateway 838 of FIG. 8). The control plane VCN 1016 can include the service gateway 1036 and the NAT gateway 1038.

The data plane VCN 1018 can include a data plane app tier 1046 (e.g. the data plane app tier 846 of FIG. 8), a data plane DMZ tier 1048 (e.g. the data plane DMZ tier 848 of FIG. 8), and a data plane data tier 1050 (e.g. the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g. public Internet 854 of FIG. 8).

The Internet gateway 1034 contained in the control plane VCN 1016 and contained in the data plane VCN 1018 can be communicatively coupled to a metadata management service 1052 (e.g. the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
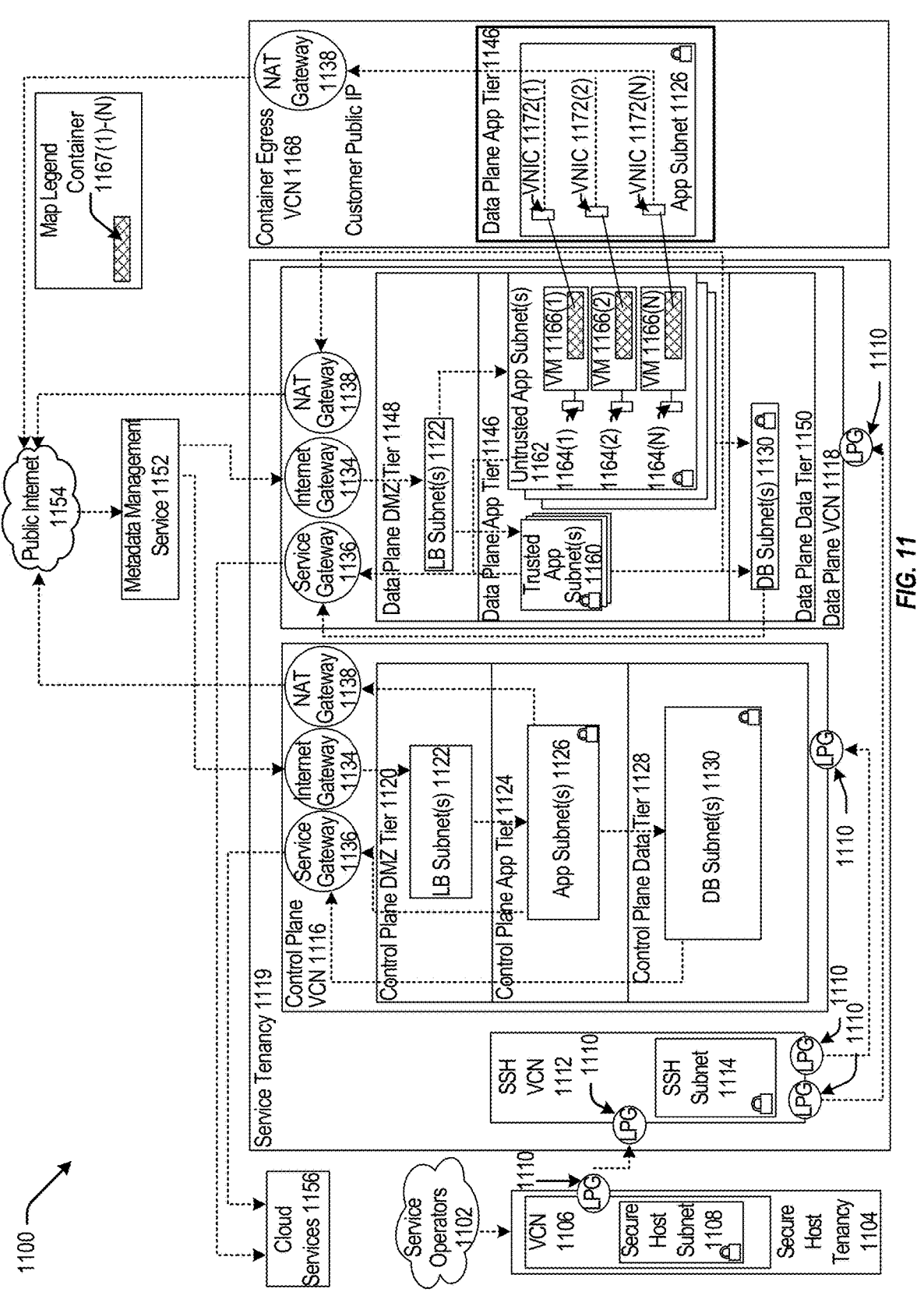
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 802 of FIG. 8) can be communicatively coupled to a secure host tenancy 1104 (e.g. the secure host tenancy 804 of FIG. 8) that can include a virtual cloud network (VCN) 1106 (e.g. the VCN 806 of FIG. 8) and a secure host subnet 1108 (e.g. the secure host subnet 808 of FIG. 8). The VCN 1106 can include an LPG 1110 (e.g. the LPG 810 of FIG. 8) that can be communicatively coupled to an SSH VCN 1112 (e.g. the SSH VCN 812 of FIG. 8) via an LPG 1110 contained in the SSH VCN 1112. The SSH VCN 1112 can include an SSH subnet 1114 (e.g. the SSH subnet 814 of FIG. 8), and the SSH VCN 1112 can be communicatively coupled to a control plane VCN 1116 (e.g. the control plane VCN 816 of FIG. 8) via an LPG 1110 contained in the control plane VCN 1116 and to a data plane VCN 1118 (e.g. the data plane 818 of FIG. 8) via an LPG 1110 contained in the data plane VCN 1118. The control plane VCN 1116 and the data plane VCN 1118 can be contained in a service tenancy 1119 (e.g. the service tenancy 819 of FIG. 8).

The control plane VCN 1116 can include a control plane DMZ tier 1120 (e.g. the control plane DMZ tier 820 of FIG. 8) that can include LB subnet(s) 1122 (e.g. LB subnet(s) 822 of FIG. 8), a control plane app tier 1124 (e.g. the control plane app tier 824 of FIG. 8) that can include app subnet(s) 1126 (e.g. app subnet(s) 826 of FIG. 8), a control plane data tier 1128 (e.g. the control plane data tier 828 of FIG. 8) that can include DB subnet(s) 1130 (e.g. DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 8) and a network address translation (NAT) gateway 1138 (e.g. the NAT gateway 838 of FIG. 8). The control plane VCN 1116 can include the service gateway 1136 and the NAT gateway 1138.

The data plane VCN 1118 can include a data plane app tier 1146 (e.g. the data plane app tier 846 of FIG. 8), a data plane DMZ tier 1148 (e.g. the data plane DMZ tier 848 of FIG. 8), and a data plane data tier 1150 (e.g. the data plane data tier 850 of FIG. 8). The data plane DMZ tier 1148 can include LB subnet(s) 1122 that can be communicatively coupled to trusted app subnet(s) 1160 (e.g. trusted app subnet(s) 1060 of FIG. 10) and untrusted app subnet(s) 1162 (e.g. untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g. public Internet 854 of FIG. 8).

The Internet gateway 1134 contained in the control plane VCN 1116 and contained in the data plane VCN 1118 can be communicatively coupled to a metadata management service 1152 (e.g. the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate certain embodiments. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
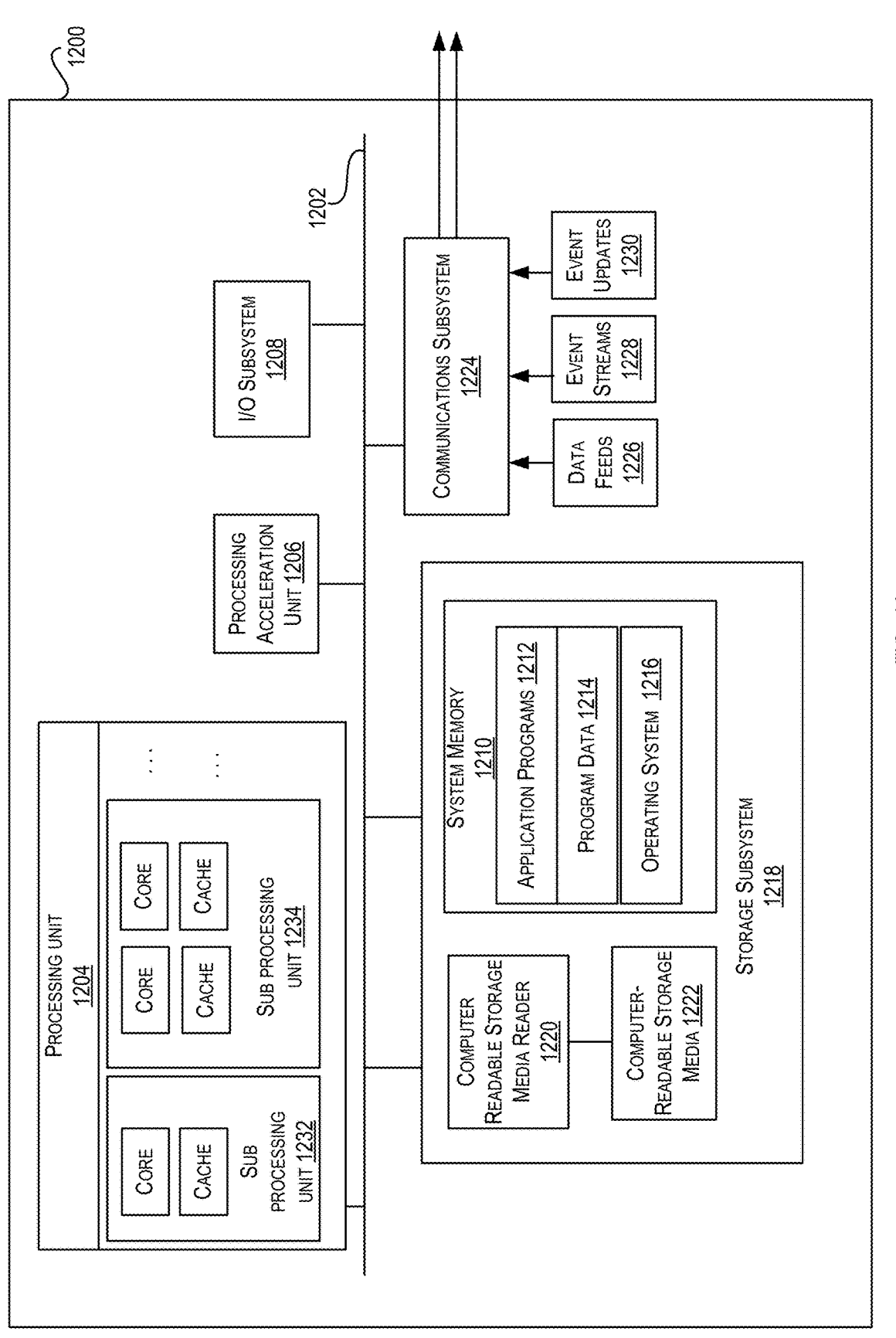
FIG. 12 is a block diagram illustrating an example computer system, according to at least one embodiment.

FIG. 12 illustrates an example computer system 1200, that may be used to implement various embodiments. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/ or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the claims is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the disclosed embodiments. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the claimed embodiments.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate certain embodiments and does not pose a limitation on the scope of the disclosed techniques. No language in the specification should be construed as indicating any non-claimed element as essential to the practice of the claimed embodiments.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments are described herein, including the best mode known for carrying out the various embodiments. Variations of those preferred embodiments may become apparent to those of ordinary skill in the art upon reading the foregoing description. Those of ordinary skill should be able to employ such variations as appropriate and the described embodiments may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, novel aspects are described with reference to specific embodiments thereof, but those skilled in the art will recognize that the disclosure is not limited thereto. Various features and aspects of the above-described embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:

receiving, by a computing device via a user interface, 1) a user-defined upper limit value indicating an upper bound of a permissible allocation range for dynamically increasing a number of computing resources in a first set of computing resources that are allocated to a client, and 2) a user-defined lower limit value indicating a lower bound of the permissible allocation range for dynamically decreasing the number of computing resources in the first set of computing resources that are allocated to the client;

monitoring, by the computing device over time, computing resource loads corresponding to the client;

determining, by the computing device and based at least in part on the monitoring, a first load threshold value and an active load value, the active load value corresponding to a level of activity of a first set of computing resources of the client during a first time period;

comparing, by the computing device, the active load value and the first load threshold value;

determining, by the computing device and based at least in part on the comparison between the active load value and the first load threshold value, a throttle state of the first set of computing resources during the first time period;

in response to determining the throttle state, selecting, by the computing device, a modification threshold value, wherein the user-defined upper limit value is selected for the modification threshold value when the throttle state indicates that the first set of computing resources are being throttled, and wherein the user-defined lower limit value is selected for the modification threshold value when the throttle state indicates that the first set of computing resources are not being throttled;

comparing, by the computing device, the first load threshold value and the modification threshold value; and during the monitoring, modifying, by the computing device and based at least in part on the determining a difference value between the active load value and the modification threshold value, the number of computing resources in the first set of computing resources of the client, wherein modifying the number of computing resources in the first set of computing resources causes the number of computing resources to be 1) increased while adhering to the user-defined upper limit value of the permissible allocation range or 2) decreased while adhering to the user-defined lower limit value of the permissible allocation range.

2. The method of claim 1, wherein the first load threshold value corresponds to a maximum throughput capability of the first set of computing resources and the active load value corresponds to a rate of data being sent to the first set of computing resources.

3. The method of claim 1, wherein:

the active load value is greater than the first load threshold value; and the throttle state indicates that the first set of computing resources is being throttled during the first time period.

4. The method of claim 3, wherein selecting the modification threshold value comprises selecting the user-defined upper limit value of the permissible allocation range.

5. The method of claim 3, wherein modifying the first set of computing resources comprises:

determining, based at least in part on the difference value, a second set of computing resources that are associated with a second load threshold value; and adding the second set of computing resources to the first set of computing resources.

6. The method of claim 1, wherein:

the active load value is less than or equal to the first load threshold value; and the throttle state indicates that the first set of computing resources is not being throttled during the first time period.

7. The method of claim 6, wherein selecting the modification threshold value comprises selecting the user-defined lower limit value of the permissible allocation range.

8. The method of claim 6, wherein modifying the first set of computing resources comprises:

determining a first subset of the first set of computing resources associated with a second load threshold value less than the difference value; and removing the first subset of the first set of computing resources from the first set of computing resources.

9. The method of claim 1, wherein modifying the first set of computing resources comprises altering the number of computing resources at one or more time intervals of a second time period occurring subsequent to the first time period, and wherein altering the number of computing resources comprises adding or removing a static number of computing resources during each of the one or more time intervals of the second time period.

10. The method of claim 9, wherein the static number of computing resources is generated based at least in part on a throttling value corresponding to a predefined proportion of throttling.

11. The method of claim 1, wherein the number of computing resources is incrementally increased or decreased over subsequent time periods based at least in part on the difference value between the active load value and the modification threshold value.

12. A non-transitory computer-readable storage medium storing a plurality of instructions executable by one or more processors of a server computer, the plurality of instructions when executed by the one or more processors cause the one or more processors to perform operations comprising:

receiving, by a computing device via a user interface, 1) a user-defined upper limit value indicating an upper bound of a permissible allocation range for dynamically increasing a number of computing resources in a first set of computing resources that are allocated to a client, and 2) a user-defined lower limit value indicating a lower bound of the permissible allocation range for dynamically decreasing the number of computing resources in the first set of computing resources that are allocated to the client;

monitoring, by the computing device over time, computing resource loads corresponding to the client;

determining, by the computing device and based at least in part on the monitoring, a first load threshold value and an active load value, the active load value corresponding to a level of activity of a first set of computing resources of the client during a first time period;

comparing, by the computing device, the active load value and the first load threshold value;

determining, by the computing device and based at least in part on the comparison between the active load value and the first load threshold value, a throttle state of the first set of computing resources during the first time period;

in response to determining the throttle state, selecting, by the computing device, a modification threshold value, wherein the user-defined upper limit value is selected for the modification threshold value when the throttle state indicates that the first set of computing resources are being throttled, and wherein the user-defined lower limit value is selected for the modification threshold value when the throttle state indicates that the first set of computing resources are not being throttled;

comparing, by the computing device, the first load threshold value and the modification threshold value; and during the monitoring, modifying, by the computing device and based at least in part on the determining a difference value between the active load value and the modification threshold value, the number of computing resources in the first set of computing resources of the client wherein modifying the number of computing resources in the first set of computing resources causes the number of computing resources to be 1) increased while adhering to the user-defined upper limit value of the permissible allocation range or 2) decreased while adhering to the user-defined lower limit value of the permissible allocation range.

13. The non-transitory computer-readable storage medium of claim 12, wherein the first load threshold value corresponds to a maximum throughput capability of the first set of computing resources and the active load value corresponds to a rate of data being sent to the first set of computing resources.

14. The non-transitory computer-readable storage medium of claim 12, wherein:

the active load value is greater than the first load threshold value; and the throttle state indicates that the first set of computing resources is being throttled during the first time period.

15. The non-transitory computer-readable storage medium of claim 14, wherein selecting the modification threshold value comprises selecting the user-defined upper limit value of the permissible allocation range.

16. The non-transitory computer-readable storage medium of claim 14, wherein modifying the first set of computing resources comprises:

determining, based at least in part on the difference value, a second set of computing resources that are associated with a second load threshold value; and adding the second set of computing resources to the first set of computing resources.

17. The non-transitory computer-readable storage medium of claim 12, wherein:

the active load value is less than or equal to the first load threshold value; and the throttle state indicates that the first set of computing resources is not being throttled during the first time period.

18. The non-transitory computer-readable storage medium of claim 17, wherein selecting the modification threshold value comprises selecting the user-defined lower limit value of the permissible allocation range.

19. A management server device comprising:

one or more data processors; and a non-transitory computer-readable storage medium comprising instructions which, when executed on the one or more data processors, cause the one or more data processors to perform operations including:

receiving, by the management server device via a user interface, 1) a user-defined upper limit value indicating an upper bound of a permissible allocation range for dynamically increasing a number of computing resources in a first set of computing resources that are allocated to a client, and 2) a user-defined lower limit value indicating a lower bound of the permissible allocation range for dynamically decreasing the number of computing resources in the first set of computing resources that are allocated to the client;

monitoring, by the management server device over time, computing resource loads corresponding to the client;

determining, by the management server device and based at least in part on the monitoring, a first load threshold value and an active load value, the active load value corresponding to a level of activity of a first set of computing resources of the client during a first time period;

comparing, by the management server device, the active load value and the first load threshold value;

determining, by the management server device and based at least in part on the comparison between the active load value and the first load threshold value, a throttle state of the first set of computing resources during the first time period;

in response to determining the throttle state, selecting, by the management server device, a modification threshold value, wherein the user-defined upper limit value is selected for the modification threshold value when the throttle state indicates that the first set of computing resources are being throttled, and wherein the user-defined lower limit value is selected for the modification threshold value when the throttle state indicates that the first set of computing resources are not being throttled;

comparing, by the management server device, the first load threshold value and the modification threshold value; and during the monitoring, modifying, by the management server device and based at least in part on the determining a difference value between the active load value and the modification threshold value, the number of computing resources in the first set of computing resources of the client, wherein modifying the number of computing resources in the first set of computing resources causes the number of computing resources to be 1) increased while adhering to the user-defined upper limit value of the permissible allocation range or 2) decreased while adhering to the user-defined lower limit value of the permissible allocation range.

20. The management server device of claim 19, wherein the number of computing resources is incrementally increased or decreased over subsequent time periods based at least in part on the difference value between the active load value and the modification threshold value.

* * * * *